(12) United States Patent
Lucas et al.

(10) Patent No.: US 8,076,873 B1
(45) Date of Patent: Dec. 13, 2011

(54) HYBRID OUTDOOR POWER EQUIPMENT

(75) Inventors: Delbert E. Lucas, Bowling Green, KY (US); Justin Lucas, Stone Mountain, GA (US); Ryan J. Lucas, Atlanta, GA (US)

(73) Assignee: MTD Products Inc, Valley City, OH (US)

( * ) Notice: Subject to any disclaimer, the term of this patent is extended or adjusted under 35 U.S.C. 154(b) by 659 days.

(21) Appl. No.: 12/156,434

(22) Filed: May 30, 2008

Related U.S. Application Data

(60) Provisional application No. 60/932,738, filed on Jun. 1, 2007.

(51) Int. Cl.
H02P 1/54 (2006.01)

(52) U.S. Cl. ......... 318/107; 318/108; 318/124; 318/244

(58) Field of Classification Search .................. 318/107, 318/106, 108, 123, 124, 244, 245, 599, 43, 318/53; 307/43, 44, 48, 112, 125, 126, 140
See application file for complete search history.

(56) References Cited

U.S. PATENT DOCUMENTS

| | | | |
|---|---|---|---|
| 963,146 A | 7/1910 | Harrison | |
| 1,115,350 A | 10/1914 | Vincent | |
| 1,357,396 A | 11/1920 | Gater | |
| 1,383,178 A | 6/1921 | Voges | |
| 1,387,578 A | 8/1921 | Yost | |
| 1,401,156 A | 12/1921 | Jenkins | |
| 1,490,127 A | 4/1924 | Peters | |
| 1,558,465 A | 10/1925 | Dahl | |
| 1,567,055 A | 12/1925 | Huff | |
| 1,603,637 A | 10/1926 | Ott | |
| 1,643,656 A | 9/1927 | Haselton | |
| 1,669,471 A | 5/1928 | Jones | |
| 1,674,847 A | 6/1928 | Watson | |
| 1,725,487 A | 8/1929 | Steinmetz et al. | |
| 1,819,791 A | 8/1931 | Reed | |
| 1,823,215 A | 9/1931 | Seal | |
| 1,827,559 A | 10/1931 | Beazley | |
| 1,829,690 A | 10/1931 | Turner | |
| 1,866,380 A | 7/1932 | Wagner | |
| RE18,944 E | 9/1933 | Beazley | |
| 1,954,579 A | 4/1934 | Smith | |
| 2,052,535 A | 8/1936 | Sherman | |
| 2,053,535 A | 9/1936 | Schielein | |
| D101,512 S | 10/1936 | Young et al. | |
| 2,167,222 A | 7/1939 | Shelor | |
| 2,185,659 A | 1/1940 | Chernow | |
| 2,237,521 A | 4/1941 | Frazier | |
| 2,298,135 A | 10/1942 | Klein | |

(Continued)

FOREIGN PATENT DOCUMENTS

EP 0024268 A1 2/1981

(Continued)

*Primary Examiner* — Walter Benson
*Assistant Examiner* — Thai Dinh
(74) *Attorney, Agent, or Firm* — Wegman, Hessler & Vanderburg

(57) ABSTRACT

Hybrid power equipment comprising a user-selectable power selection switch for switching between DC or AC power, a boost and conserve feature for increasing speed of the working elements as necessary, and a motor or a plurality of motors for moving working elements. Running the OPE at the conserve setting prolongs battery pack duration per charge. The motor may comprise a dual coil commutator configuration. Power supply and control systems allow the user to select operation of the plurality motors or dual coil commutators in either series or parallel configuration depending on the power source.

13 Claims, 18 Drawing Sheets

U.S. PATENT DOCUMENTS

| | | | |
|---|---|---|---|
| 2,417,613 | A | 3/1947 | Radabaugh |
| 2,458,200 | A | 1/1949 | Renfroe et al. |
| 2,469,022 | A | 5/1949 | Walker et al. |
| D154,108 | S | 6/1949 | Emmons |
| 2,480,944 | A | 9/1949 | Malpass |
| 2,485,729 | A | 10/1949 | Gentry |
| 2,496,022 | A | 1/1950 | Remonte |
| 2,498,609 | A | 2/1950 | Reil |
| 2,498,796 | A | 2/1950 | Downer |
| D158,847 | S | 6/1950 | Flanigan |
| 2,514,278 | A | 7/1950 | Dunn et al. |
| 2,521,262 | A | 9/1950 | Smith |
| 2,547,328 | A | 4/1951 | Koch et al. |
| 2,549,317 | A | 4/1951 | Laughlin |
| 2,554,790 | A | 5/1951 | Miller |
| 2,592,856 | A | 4/1952 | Brockman |
| 2,597,735 | A | 5/1952 | Jepson |
| D167,129 | S | 7/1952 | Abel et al. |
| D168,683 | S | 1/1953 | Heineke |
| 2,633,688 | A | 4/1953 | Yeck et al. |
| D172,807 | S | 8/1954 | Rosenberg |
| D172,936 | S | 8/1954 | Phelps |
| 2,690,892 | A | 10/1954 | La Bar |
| 2,700,862 | A | 2/1955 | Abel |
| 2,702,448 | A | 2/1955 | Smith |
| 2,708,977 | A | 5/1955 | Scheppe |
| 2,709,882 | A | 6/1955 | Abel |
| 2,716,559 | A | 8/1955 | Boyce |
| 2,724,229 | A | 11/1955 | Graham |
| 2,728,182 | A | 12/1955 | Fulton et al. |
| 2,763,116 | A | 9/1956 | Flinchbaugh et al. |
| 2,766,573 | A | 10/1956 | Shewmon |
| 2,770,085 | A | 11/1956 | Laughlin |
| D179,511 | S | 1/1957 | Graham et al. |
| 2,793,484 | A | 5/1957 | McNeill et al. |
| 2,793,485 | A | 5/1957 | Emmons et al. |
| RE24,594 | E | 1/1959 | Smith |
| 2,867,960 | A | 1/1959 | Stiles et al. |
| D184,861 | S | 4/1959 | Ellies |
| 2,906,081 | A | 9/1959 | Flanigan |
| 2,908,128 | A | 10/1959 | Mauro |
| 2,909,885 | A | 10/1959 | Smith |
| 2,926,478 | A | 3/1960 | Jepson |
| 2,926,926 | A | 3/1960 | Rowe et al. |
| 2,929,926 | A | 3/1960 | Fibranz |
| 2,938,323 | A | 5/1960 | Livingston et al. |
| 2,941,346 | A | 6/1960 | Perry |
| 2,942,397 | A | 6/1960 | Clark |
| 2,970,419 | A | 2/1961 | Lieberman |
| 2,979,878 | A | 4/1961 | Kaposta |
| 2,983,057 | A | 5/1961 | Erickson |
| D191,675 | S | 10/1961 | Ernest |
| 3,017,733 | A | 1/1962 | Evans |
| D192,373 | S | 3/1962 | Mascaro |
| D192,605 | S | 4/1962 | Mascaro |
| 3,028,717 | A | 4/1962 | West |
| 3,034,275 | A | 5/1962 | Happe et al. |
| 3,035,386 | A | 5/1962 | Jepson et al. |
| D193,197 | S | 7/1962 | Czerwonky |
| 3,077,066 | A | 2/1963 | Nokes |
| 3,128,840 | A | 4/1964 | Barrett, Jr. |
| 3,144,258 | A | 8/1964 | Ottosen et al. |
| 3,147,987 | A | 9/1964 | Ritums |
| 3,212,244 | A | 10/1965 | Wilgus |
| 3,217,824 | A | 11/1965 | Jepson |
| 3,221,481 | A | 12/1965 | Mattson et al. |
| 3,230,695 | A | 1/1966 | West |
| 3,271,939 | A | 9/1966 | Granger, Jr. et al. |
| 3,298,163 | A | 1/1967 | Ottosen et al. |
| D207,230 | S | 3/1967 | Stewart |
| D207,326 | S | 4/1967 | Stewart |
| D207,721 | S | 5/1967 | Stewart |
| D207,856 | S | 6/1967 | Averitt et al. |
| 3,350,864 | A | 11/1967 | Sheps et al. |
| 3,375,338 | A | 3/1968 | Delf |
| D211,264 | S | 6/1968 | Stewart et al. |
| 3,456,430 | A | 7/1969 | Maloney |
| 3,481,123 | A | 12/1969 | Lessig, III |
| 3,485,017 | A | 12/1969 | Duran et al. |
| 3,485,018 | A | 12/1969 | Beckering et al. |
| 3,485,418 | A | 12/1969 | Webster |
| 3,496,706 | A | 2/1970 | Mattson |
| 3,500,085 | A | 3/1970 | Smith |
| 3,500,620 | A | 3/1970 | Duran et al. |
| 3,525,912 | A | 8/1970 | Wallin |
| D218,766 | S | 9/1970 | Musichuk |
| 3,550,714 | A | 12/1970 | Bellinger |
| 3,564,186 | A | 2/1971 | Mittelstadt et al. |
| 3,570,226 | A | 3/1971 | Haverkamp et al. |
| 3,570,227 | A | 3/1971 | Bellinger |
| 3,581,480 | A | 6/1971 | O'Connor, III et al. |
| 3,583,138 | A | 6/1971 | Mattson |
| 3,586,275 | A | 6/1971 | Mittelstadt et al. |
| 3,593,505 | A | 7/1971 | Mittelstadt |
| 3,593,950 | A | 7/1971 | Tetzlaff |
| D221,574 | S | 8/1971 | Bunyea |
| 3,603,065 | A | 9/1971 | Weber |
| 3,613,338 | A | 10/1971 | Furtaw |
| 3,617,786 | A | 11/1971 | Stielper |
| 3,631,659 | A | 1/1972 | Horowitz |
| 3,641,749 | A | 2/1972 | Dwyer, Jr. et al. |
| 3,657,868 | A | 4/1972 | Cousino |
| 3,659,170 | A | 4/1972 | Burkett et al. |
| 3,696,593 | A | 10/1972 | Thorud et al. |
| 3,731,471 | A | 5/1973 | Bening |
| 3,732,671 | A | 5/1973 | Allen et al. |
| 3,733,794 | A | 5/1973 | Allen |
| 3,789,939 | A | 2/1974 | Geislinger |
| 3,800,902 | A | 4/1974 | Keller |
| 3,809,975 | A | 5/1974 | Bartels |
| 3,916,280 | A | 10/1975 | Heindl |
| 3,924,389 | A | 12/1975 | Kita |
| 3,948,024 | A | 4/1976 | Allen et al. |
| 3,955,653 | A | 5/1976 | Comer |
| 3,969,593 | A | 7/1976 | Vlahos |
| 3,969,875 | A | 7/1976 | Nofel |
| 3,970,913 | A | 7/1976 | Heindl |
| 3,980,068 | A | 9/1976 | Karsten et al. |
| 4,003,190 | A | 1/1977 | Braun et al. |
| 4,008,423 | A | 2/1977 | Christianson |
| 4,081,737 | A | 3/1978 | Miyahara |
| D249,266 | S | 9/1978 | Furuya |
| 4,145,864 | A | 3/1979 | Brewster, Jr. |
| 4,178,741 | A | 12/1979 | Lonn et al. |
| 4,181,206 | A | 1/1980 | Seilenbinder |
| 4,236,494 | A | 12/1980 | Fairchild |
| 4,244,160 | A | 1/1981 | Carolan |
| 4,267,914 | A | 5/1981 | Saar |
| 4,292,571 | A * | 9/1981 | Cuneo ............................ 318/17 |
| 4,294,327 | A | 10/1981 | Howard |
| 4,307,325 | A | 12/1981 | Saar |
| 4,318,266 | A | 3/1982 | Taube |
| 4,321,523 | A | 3/1982 | Hammel |
| 4,333,302 | A | 6/1982 | Thomas et al. |
| 4,371,906 | A | 2/1983 | Alessio et al. |
| 4,412,158 | A | 10/1983 | Jefferson et al. |
| 4,430,604 | A | 2/1984 | Loganbill et al. |
| 4,447,786 | A | 5/1984 | Saar et al. |
| 4,489,267 | A | 12/1984 | Saar et al. |
| 4,503,370 | A | 3/1985 | Cuneo |
| 4,527,101 | A | 7/1985 | Zavis et al. |
| 4,536,757 | A | 8/1985 | Ijntema |
| 4,550,277 | A | 10/1985 | Carney |
| 4,628,233 | A | 12/1986 | Bradus |
| 4,764,715 | A | 8/1988 | Kowalewski et al. |
| 4,870,811 | A | 10/1989 | Steele |
| 4,878,338 | A | 11/1989 | Aldred et al. |
| 4,887,415 | A | 12/1989 | Martin |
| 4,893,067 | A | 1/1990 | Bhagwat et al. |
| 4,905,300 | A | 2/1990 | Bhagwat et al. |
| RE33,376 | E | 10/1990 | Gibbons et al. |
| 4,964,265 | A | 10/1990 | Young |
| 4,987,729 | A | 1/1991 | Paytas |
| 4,990,843 | A | 2/1991 | Moren et al. |
| 5,028,853 | A | 7/1991 | Brown, Jr. et al. |
| 5,055,725 | A | 10/1991 | LaSota |
| 5,085,043 | A | 2/1992 | Hess et al. |

| Patent | Type | Date | Name |
|---|---|---|---|
| 5,086,491 | A | 2/1992 | Cuneo |
| D330,210 | S | 10/1992 | Sirois et al. |
| 5,173,650 | A | 12/1992 | Hedlund |
| D333,309 | S | 2/1993 | Hess et al. |
| 5,203,147 | A | 4/1993 | Long |
| 5,208,519 | A | 5/1993 | Dykstra et al. |
| 5,227,710 | A | 7/1993 | Lewus |
| D342,425 | S | 12/1993 | Watanabe et al. |
| 5,301,494 | A | 4/1994 | Peot et al. |
| D346,810 | S | 5/1994 | Schulz et al. |
| D347,640 | S | 6/1994 | Chunn et al. |
| 5,321,939 | A | 6/1994 | Fuse et al. |
| 5,325,650 | A | 7/1994 | Fuse et al. |
| 5,379,991 | A | 1/1995 | Delam et al. |
| 5,388,176 | A | 2/1995 | Dykstra et al. |
| D356,581 | S | 3/1995 | Chunn et al. |
| D357,690 | S | 4/1995 | Gobel |
| 5,410,229 | A | 4/1995 | Sebastian et al. |
| D361,771 | S | 8/1995 | Ledingham |
| 5,440,215 | A | 8/1995 | Gilmore |
| 5,442,901 | A | 8/1995 | Niemela et al. |
| 5,455,886 | A | 10/1995 | Glenn et al. |
| 5,465,016 | A | 11/1995 | Mancl et al. |
| 5,490,370 | A | 2/1996 | McNair et al. |
| 5,528,148 | A | 6/1996 | Rogers |
| 5,551,220 | A | 9/1996 | Suller et al. |
| 5,563,668 | A | 10/1996 | Ozaki et al. |
| D375,963 | S | 11/1996 | Braun et al. |
| 5,572,856 | A | 11/1996 | Ku |
| 5,584,723 | A | 12/1996 | Sutliff et al. |
| 5,596,236 | A | 1/1997 | Lee et al. |
| 5,602,459 | A | 2/1997 | Rogers |
| 5,606,851 | A | 3/1997 | Bruener et al. |
| 5,610,499 | A | 3/1997 | Rogers |
| 5,615,540 | A | 4/1997 | Yang |
| 5,619,845 | A | 4/1997 | Bruener et al. |
| 5,638,667 | A | 6/1997 | Ellson et al. |
| 5,638,668 | A | 6/1997 | Kallevig et al. |
| D381,665 | S | 7/1997 | Hinkin et al. |
| 5,686,807 | A | 11/1997 | Kusano et al. |
| 5,703,450 | A | 12/1997 | Josephs |
| D390,576 | S | 2/1998 | Shimamura |
| 5,713,189 | A | 2/1998 | Toman |
| 5,727,372 | A | 3/1998 | Kanitz et al. |
| 5,730,397 | A | 3/1998 | Van Niekerk |
| 5,731,673 | A | 3/1998 | Gilmore |
| 5,736,837 | A | 4/1998 | Noda |
| 5,751,124 | A | 5/1998 | Josephs |
| 5,757,154 | A | 5/1998 | Peot |
| 5,757,162 | A | 5/1998 | Weber |
| 5,761,892 | A | 6/1998 | Quiroga |
| 5,775,074 | A | 7/1998 | Walter |
| 5,775,473 | A | 7/1998 | Cordero |
| 5,787,693 | A | 8/1998 | Dyke |
| 5,790,355 | A | 8/1998 | Ishmael |
| 5,794,422 | A | 8/1998 | Reimers et al. |
| 5,819,513 | A | 10/1998 | Braun et al. |
| 5,864,223 | A | 1/1999 | Meyer |
| 5,894,715 | A | 4/1999 | Braun et al. |
| 5,906,088 | A | 5/1999 | Inui et al. |
| 5,910,091 | A | 6/1999 | Iida et al. |
| 5,911,670 | A | 6/1999 | Angott et al. |
| RE36,250 | E | 7/1999 | Hess et al. |
| 5,934,051 | A | 8/1999 | Hahn |
| 5,934,053 | A | 8/1999 | Fillman et al. |
| 5,937,622 | A | 8/1999 | Carrier et al. |
| 5,937,623 | A | 8/1999 | Wolf |
| 5,953,890 | A | 9/1999 | Shimada et al. |
| 5,969,507 | A | 10/1999 | Meyer |
| 5,974,347 | A | 10/1999 | Nelson |
| 5,994,857 | A | 11/1999 | Peterson, Jr. et al. |
| 6,009,358 | A | 12/1999 | Angott et al. |
| D419,163 | S | 1/2000 | Sirois et al. |
| 6,018,231 | A | 1/2000 | Shaver et al. |
| D421,265 | S | 2/2000 | Ohsumi et al. |
| 6,018,937 | A | 2/2000 | Shimada et al. |
| 6,019,010 | A | 2/2000 | Trinder |
| 6,039,598 | A | 3/2000 | Ciavarella |
| D422,605 | S | 4/2000 | Danthois |
| D426,836 | S | 6/2000 | Sirois et al. |
| 6,087,805 | A | 7/2000 | Langston et al. |
| 6,092,355 | A | 7/2000 | Ishmael |
| 6,094,025 | A | 7/2000 | Rosa |
| 6,104,155 | A | 8/2000 | Rosa |
| 6,104,162 | A * | 8/2000 | Sainsbury et al. ............ 320/111 |
| 6,105,348 | A | 8/2000 | Turk et al. |
| 6,114,833 | A | 9/2000 | Langston et al. |
| 6,124,791 | A | 9/2000 | Wolf |
| 6,154,007 | A | 11/2000 | Shaver et al. |
| 6,170,173 | B1 | 1/2001 | Caston |
| 6,170,179 | B1 | 1/2001 | Paytas et al. |
| 6,170,241 | B1 | 1/2001 | Shibilski et al. |
| 6,172,437 | B1 | 1/2001 | Du |
| 6,195,970 | B1 | 3/2001 | Held et al. |
| 6,202,396 | B1 | 3/2001 | Thomas |
| 6,220,005 | B1 | 4/2001 | Plamper et al. |
| 6,240,713 | B1 | 6/2001 | Thomas |
| 6,269,617 | B1 | 8/2001 | Blanchard |
| 6,286,609 | B1 | 9/2001 | Carrier et al. |
| D449,840 | S | 10/2001 | Concari et al. |
| D450,064 | S | 11/2001 | Concari et al. |
| 6,316,891 | B1 | 11/2001 | Hough |
| 6,320,351 | B1 | 11/2001 | Ng et al. |
| 6,359,344 | B1 | 3/2002 | Klein et al. |
| 6,374,584 | B1 | 4/2002 | Blanchard |
| D457,897 | S | 5/2002 | Jong |
| 6,404,078 | B1 | 6/2002 | Thomas et al. |
| D460,083 | S | 7/2002 | Rosse |
| D460,973 | S | 7/2002 | Jong |
| 6,424,799 | B1 | 7/2002 | Gilmore |
| 6,425,231 | B1 | 7/2002 | Yilmaz |
| 6,427,429 | B1 | 8/2002 | Brabenec |
| 6,456,508 | B1 | 9/2002 | Namai et al. |
| 6,479,958 | B1 | 11/2002 | Thompson et al. |
| 6,479,964 | B2 | 11/2002 | Woodroffe et al. |
| 6,484,484 | B1 | 11/2002 | Thomas |
| 6,487,837 | B1 | 12/2002 | Fillman et al. |
| 6,523,334 | B1 | 2/2003 | Dettmann |
| 6,525,509 | B1 | 2/2003 | Petersson et al. |
| 6,531,850 | B1 | 3/2003 | Griffin et al. |
| 6,538,403 | B2 | 3/2003 | Gorti et al. |
| 6,558,829 | B1 | 5/2003 | Faris et al. |
| 6,571,542 | B1 | 6/2003 | Fillman et al. |
| 6,586,908 | B2 | 7/2003 | Petersson et al. |
| 6,591,593 | B1 | 7/2003 | Brandon et al. |
| 6,604,348 | B2 | 8/2003 | Hunt |
| 6,606,845 | B1 | 8/2003 | Spies |
| 6,646,406 | B1 | 11/2003 | Pollock et al. |
| 6,658,829 | B2 | 12/2003 | Kobayashi et al. |
| 6,666,008 | B2 | 12/2003 | Iida et al. |
| 6,668,530 | B2 | 12/2003 | Kern et al. |
| 6,707,268 | B1 | 3/2004 | Bell et al. |
| 6,720,679 | B2 | 4/2004 | Harada et al. |
| 6,728,607 | B1 | 4/2004 | Anderson |
| D489,734 | S | 5/2004 | Lin |
| 6,729,114 | B2 | 5/2004 | Fillman et al. |
| 6,734,647 | B2 | 5/2004 | Wakitani et al. |
| 6,750,622 | B2 | 6/2004 | Simizu et al. |
| 6,758,030 | B2 | 7/2004 | Dettmann |
| 6,765,317 | B2 * | 7/2004 | Chu ............................ 307/150 |
| 6,779,749 | B2 | 8/2004 | Laporta |
| 6,788,020 | B1 | 9/2004 | Pollock et al. |
| 6,798,160 | B2 | 9/2004 | Wakitani et al. |
| 6,802,175 | B2 | 10/2004 | Fillman et al. |
| 6,826,895 | B2 | 12/2004 | Iida et al. |
| 6,836,614 | B2 | 12/2004 | Gilmore |
| 6,850,029 | B1 | 2/2005 | Pollock et al. |
| 6,857,253 | B2 | 2/2005 | Reimers et al. |
| 6,867,561 | B1 | 3/2005 | Pollock et al. |
| 6,874,306 | B2 | 4/2005 | Hishida |
| 6,886,317 | B2 | 5/2005 | Jackson et al. |
| D508,923 | S | 8/2005 | Henssler et al. |
| D509,513 | S | 9/2005 | Henssler et al. |
| 6,938,400 | B2 | 9/2005 | Fillman et al. |
| 6,943,510 | B2 | 9/2005 | Gorti |
| 6,946,762 | B2 | 9/2005 | Rinholm et al. |
| 6,948,299 | B2 | 9/2005 | Osborne |
| 6,949,898 | B2 | 9/2005 | Inui et al. |

| | | | |
|---|---|---|---|
| D511,348 S | 11/2005 | Elsworthy | |
| 6,971,951 B2 | 12/2005 | Boyer | |
| 6,977,473 B2 | 12/2005 | Wakitani et al. | |
| D513,756 S | 1/2006 | Henssler et al. | |
| 6,983,583 B2 | 1/2006 | Bucher | |
| 6,987,328 B2 | 1/2006 | Osborne | |
| 7,007,446 B2 | 3/2006 | Dettmann | |
| 7,015,662 B2 | 3/2006 | Wakitani et al. | |
| 7,017,327 B2 | 3/2006 | Hunt et al. | |
| 7,023,159 B2 | 4/2006 | Gorti et al. | |
| 7,051,498 B2 | 5/2006 | Modzik et al. | |
| D523,805 S | 6/2006 | Martin | |
| 7,111,443 B2 | 9/2006 | Anderson et al. | |
| 7,116,065 B2 | 10/2006 | Wakitani et al. | |
| 7,134,261 B2 | 11/2006 | Inui et al. | |
| 7,164,252 B1 * | 1/2007 | Myers et al. | 318/800 |
| 7,168,227 B2 | 1/2007 | Derby, V et al. | |
| 7,282,818 B2 * | 10/2007 | Kovarik | 307/117 |
| 7,382,104 B2 * | 6/2008 | Jacobson et al. | 318/276 |
| 7,526,833 B2 * | 5/2009 | Cochran et al. | 15/327.2 |
| 7,578,357 B2 * | 8/2009 | Schell | 173/1 |
| 2002/0069631 A1 | 6/2002 | Dyke et al. | |
| 2002/0093299 A1 | 7/2002 | Kobayashi et al. | |
| 2002/0100265 A1 | 8/2002 | Mil'shtein et al. | |
| 2002/0174639 A1 | 11/2002 | Fowler | |
| 2002/0184865 A1 | 12/2002 | Short | |
| 2003/0037522 A1 | 2/2003 | Kobayashi et al. | |
| 2003/0037523 A1 | 2/2003 | Shimada et al. | |
| 2003/0037524 A1 | 2/2003 | Iida et al. | |
| 2003/0062723 A1 | 4/2003 | Mancl et al. | |
| 2003/0127932 A1 | 7/2003 | Ishida et al. | |
| 2003/0222607 A1 | 12/2003 | Simizu et al. | |
| 2004/0134175 A1 | 7/2004 | Osborne | |
| 2004/0135373 A1 | 7/2004 | Osborne | |
| 2005/0005588 A1 | 1/2005 | Jager | |
| 2005/0029025 A1 | 2/2005 | Medina | |
| 2005/0044835 A1 | 3/2005 | Hishida | |
| 2005/0066643 A1 | 3/2005 | Fukushima et al. | |
| 2005/0126149 A1 | 6/2005 | Heinz et al. | |
| 2005/0146308 A1 | 7/2005 | Quazi et al. | |
| 2005/0156559 A1 | 7/2005 | Thibedeau et al. | |
| 2005/0188665 A1 | 9/2005 | Reimers et al. | |
| 2005/0193707 A1 | 9/2005 | Hancock et al. | |
| 2005/0217230 A1 | 10/2005 | Bucher | |
| 2005/0230168 A1 | 10/2005 | Fillman et al. | |
| 2005/0262819 A1 | 12/2005 | Weber et al. | |
| 2006/0042212 A1 | 3/2006 | Shoemaker et al. | |
| 2006/0059880 A1 | 3/2006 | Angott | |
| 2006/0087185 A1 | 4/2006 | Patridge | |
| 2006/0087280 A1 | 4/2006 | Miyashita et al. | |
| 2006/0087285 A1 | 4/2006 | Phillips et al. | |
| 2006/0096266 A1 | 5/2006 | Dettmann | |
| 2007/0209344 A1 | 9/2007 | Berkeley | |
| 2007/0209644 A1 | 9/2007 | Gannam | |

FOREIGN PATENT DOCUMENTS

| | | |
|---|---|---|
| EP | 0639881 B1 | 2/1995 |
| EP | 1110678 A1 | 6/2001 |

* cited by examiner

HYBRID OUTDOOR POWER EQUIPMENT

CROSS-REFERENCE TO RELATED APPLICATIONS

The present application claims the benefit under 35 U.S.C. §119(e) of U.S. Provisional Application Ser. No. 60/932,738, filed Jun. 1, 2007, which is incorporated herein by reference.

The present application is a continuation-in-part application and claims priority under 35 U.S.C. §120 to U.S. patent application Ser. No. 12/077,049 entitled: Hybrid Electric Device filed Mar. 14, 2008, (pending) which is a continuation-in-part application and claims priority under 35 U.S.C. §120 to U.S. patent application Ser. No. 11/906,546 entitled: Hybrid Electric Device filed Oct. 1, 2007, (pending) which is a continuation-in-part application and claims priority under 35 U.S.C. §120 to U.S. patent application Ser. No. 11/899,616 entitled: Hybrid Electric Lawnmower filed Sep. 5, 2007, (pending) which is a continuation-in-part application claiming priority under 35 U.S.C. §120 to U.S. patent application Ser. No. 11/670,932 entitled: Hybrid Electric Lawnmower filed Feb. 2, 2007, (pending) which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006, (pending) which is a continuation-in-part application claiming priority under 35 U.S.C. §120 to U.S. patent application Ser. No. 11/550,104 entitled: Hybrid Electric Lawnmower filed Oct. 17, 2006 (pending). Further, U.S. patent application Ser. No. 12/077,049 entitled: Hybrid Electric Device filed Mar. 14, 2008, (pending) is also a continuation-in-part application and claims priority under 35 U.S.C. §120 to U.S. patent application Ser. No. 11/906,541 entitled: Hybrid Electric Device filed Oct. 1, 2007, (pending) which is a continuation-in-part application and claims priority under 35 U.S.C. §120 to U.S. patent application Ser. No. 11/899,616 entitled: Hybrid Electric Lawnmower filed Sep. 5, 2007, (pending) which is a continuation-in-part application claiming priority under 35 U.S.C. §120 to U.S. patent application Ser. No. 11/670,932 entitled: Hybrid Electric Lawnmower filed Feb. 2, 2007, (pending) which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006, (pending) which is a continuation-in-part application claiming priority under 35 U.S.C. §120 to U.S. patent application Ser. No. 11/550,104 entitled: Hybrid Electric Lawnmower filed Oct. 17, 2006 (pending).

The present application is a continuation-in-part application and claims priority under 35 U.S.C. §120 to U.S. patent application Ser. No. 12/077,079 entitled: Hybrid Electric Cleaning Device filed Oct. 1, 2007, (pending) which is a continuation-in-part application and claims priority under 35 U.S.C. §120 to U.S. patent application Ser. No. 11/906,546 entitled: Hybrid Electric Device filed Oct. 1, 2007, (pending) which is a continuation-in-part application and claims priority under 35 U.S.C. §120 to U.S. patent application Ser. No. 11/899,616 entitled: Hybrid Electric Lawnmower filed Sep. 5, 2007, (pending) which is a continuation-in-part application claiming priority under 35 U.S.C. §120 to U.S. patent application Ser. No. 11/670,932 entitled: Hybrid Electric Lawnmower filed Feb. 2, 2007, (pending) which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006, (pending) which is a continuation-in-part application claiming priority under 35 U.S.C. §120 to U.S. patent application Ser. No. 11/550,104 entitled: Hybrid Electric Lawnmower filed Oct. 17, 2006 (pending). Further, U.S. patent application Ser. No. 12/077,079 entitled: Hybrid Electric Cleaning Device filed Oct. 1, 2007, (pending) is also a continuation-in-part application and claims priority under 35 U.S.C. §120 to U.S. patent application Ser. No. 11/906,541 entitled: Hybrid Electric Device filed Oct. 1, 2007, (pending) which is a continuation-in-part application and claims priority under 35 U.S.C. §120 to U.S. patent application Ser. No. 11/899,616 entitled: Hybrid Electric Lawnmower filed Sep. 5, 2007, (pending) which is a continuation-in-part application claiming priority under 35 U.S.C. §120 to U.S. patent application Ser. No. 11/670,932 entitled: Hybrid Electric Lawnmower filed Feb. 2, 2007, (pending) which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006, (pending) which is a continuation-in-part application claiming priority under 35 U.S.C. §120 to U.S. patent application Ser. No. 11/550,104 entitled: Hybrid Electric Lawnmower filed Oct. 17, 2006 (pending).

U.S. patent application Ser. Nos. 12/077,049, 12/077,079, 11/906,546, 11/906,541, 11/899,616, 11/670,932, 11/550,476 and 11/550,104 are hereby incorporated by reference in their entireties herein.

FIELD OF THE INVENTION

The present invention generally relates to the field of outdoor power equipment, and more particularly to blowers, chain saws, hedge trimmers, and string trimmers having a boost/conserve power feature, a dual mode power supply providing power to an outdoor power equipment motor or motors, and dual electric motors or dual voltage motors powering the working elements.

BACKGROUND OF THE INVENTION

Outdoor power equipment (OPE) is known to assist an individual in performing various tasks including blowing debris, trimming foliage, cutting trees, and other assorted landscaping, home, or work-related processes. Various power sources for OPE known in the art include gasoline, alternating current (AC) electric power, and direct current (DC) electric power.

Gasoline powered OPE may present a number of consumer and professional concerns including environmental impact from emissions, price of fuel source, to availability of fuel source, fuel leakage, increased OPE unit size and weight, and other similar considerations. In light of these concerns and other considerations, many users may prefer an electrical power source for OPE. Generally, electrically powered OPE may utilize either alternating current (AC) electric power or direct current (DC) electric power. However, such electrically powered OPE has associated disadvantages. For instance, an AC powered OPE may have limited range, such as the range determined by the length of the power cord used, or may have limited power due to available household current. A DC powered OPE may have usage limited by battery life and the OPE may have less than desirable power capabilities for certain situations, such as when the motor driving the working elements experiences significant loads for an extended period of time. Additionally, electric OPE, and particularly battery powered OPE, have historically had limited operating time per charge and have had increased weight due to the battery pack. When operating off the battery pack, it has been difficult to do large jobs due to the limited run time per charge. Therefore, there remains a need for OPE that utilizes an electric power source that provides the flexibility and utility of an AC power source and a DC power source, while reducing or eliminating the disadvantages associated with electric power sources.

SUMMARY OF THE INVENTION

Accordingly, the present invention is directed to OPE having a boost/conserve power feature, a dual mode power supply providing power to OPE motors, and a motor or a plurality of motors powering the working elements. In one embodiment, the motor or plurality of motors is an electric motor or electric motors. In another embodiment, the motor or plurality of motors is a DC electric motor or DC electric motors.

The present invention is also directed to OPE having a boost/conserve power feature, a selectable dual mode power supply providing power to OPE motors from an AC power source or a DC power source, and a motor or a plurality of motors powering the working elements.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1A:
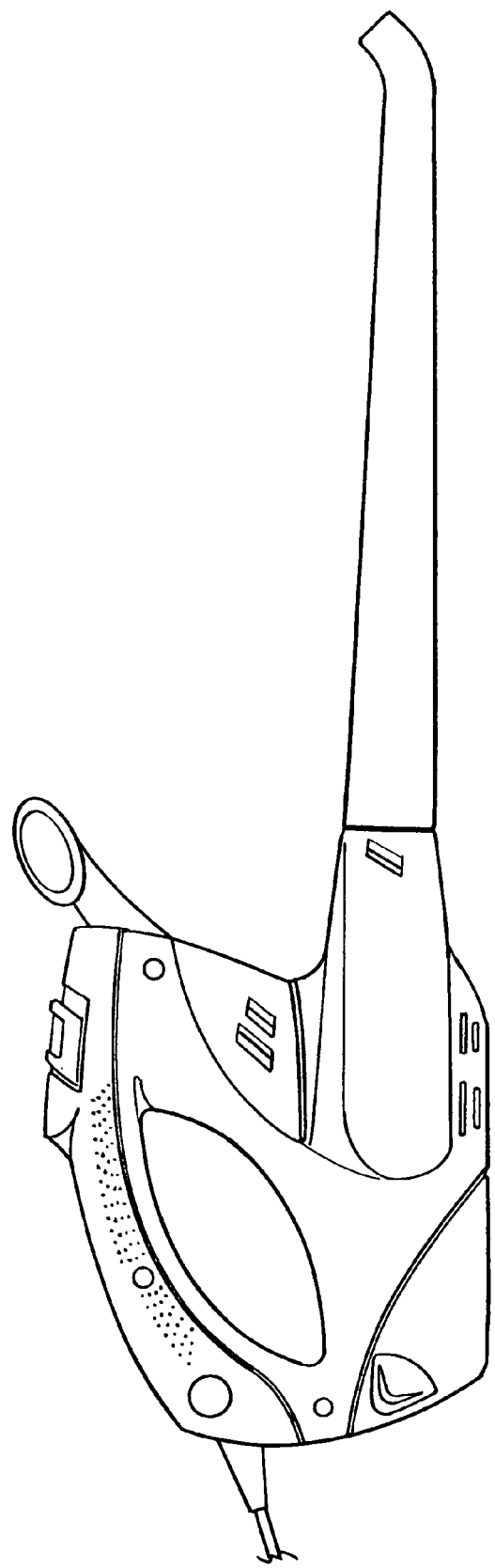
FIG. 1A is a partial side elevation view of a hybrid power blower in accordance with an exemplary embodiment of the present invention.
Figure 1B:
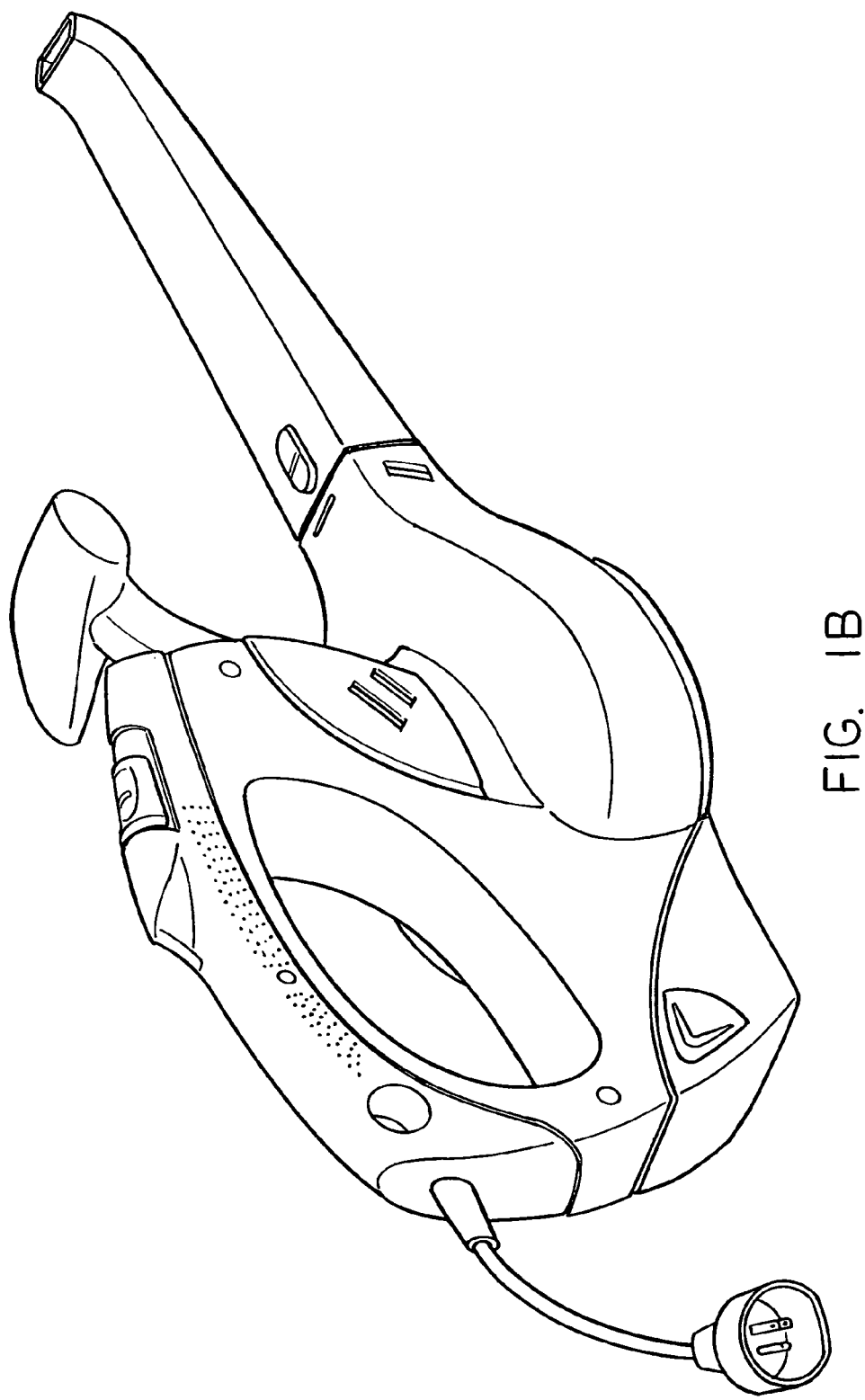
FIG. 1B is a partial perspective view of the hybrid power blower displayed in FIG. 1A.
Figure 2A:
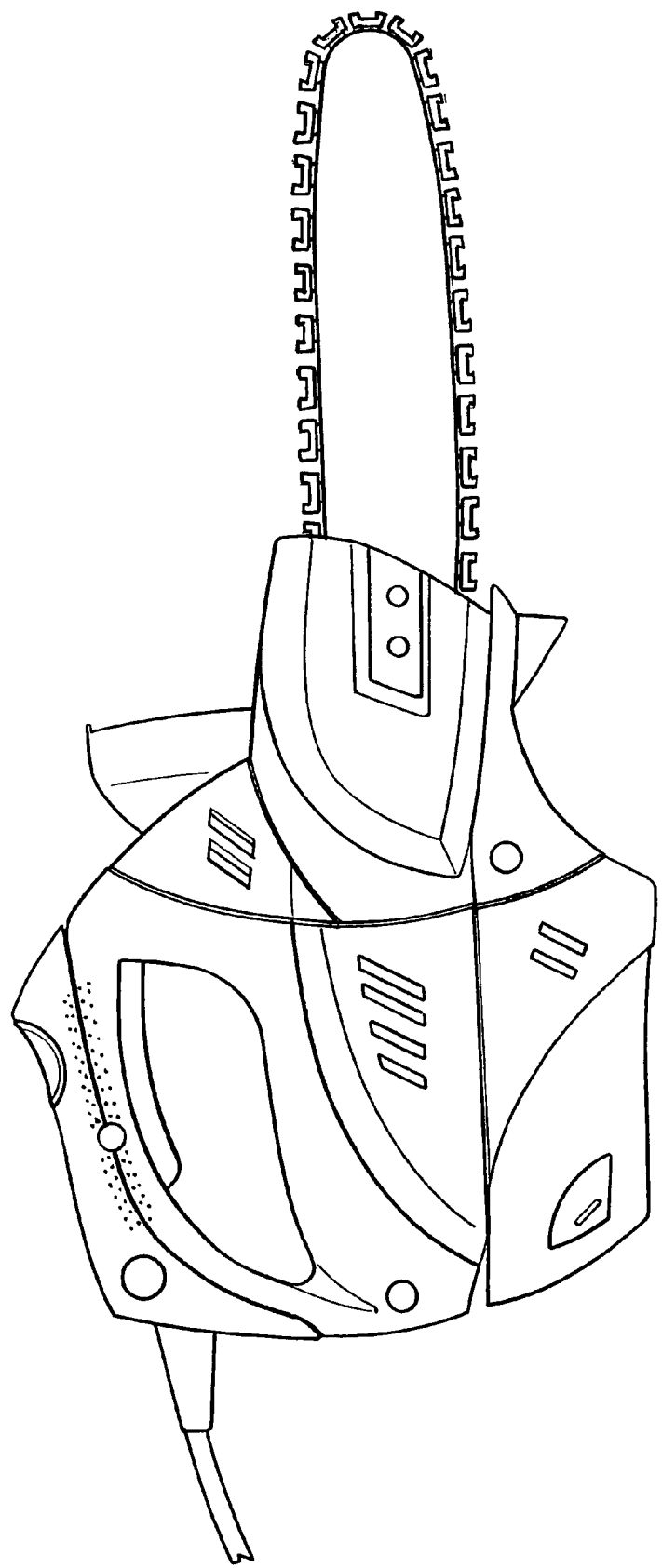
FIG. 2A is a side elevation view of a hybrid power chain saw in accordance with an exemplary embodiment of the present invention.
Figure 2B:
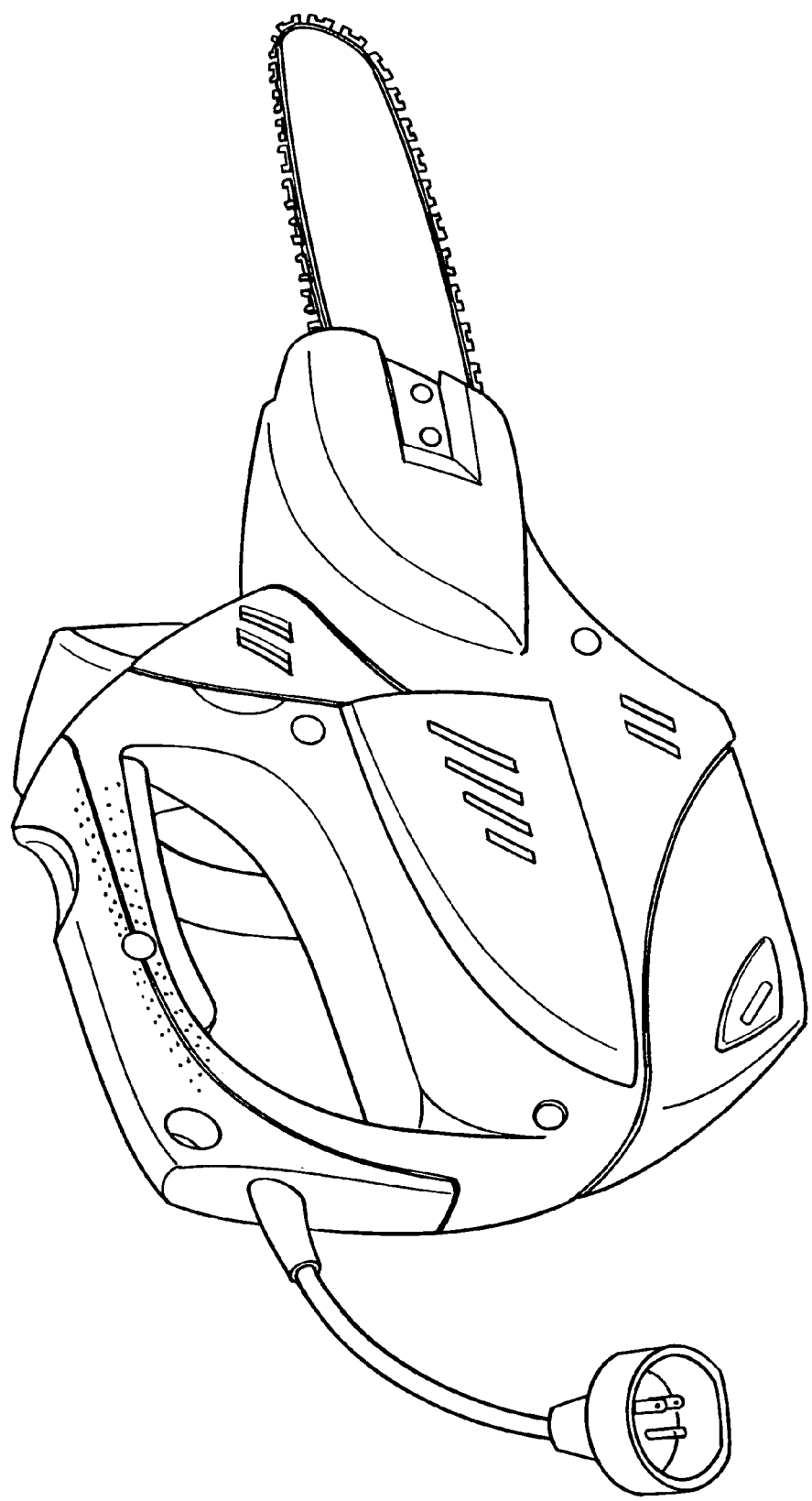
FIG. 2B is a perspective view of the hybrid power chain saw shown in FIG. 2A.
Figure 3A:
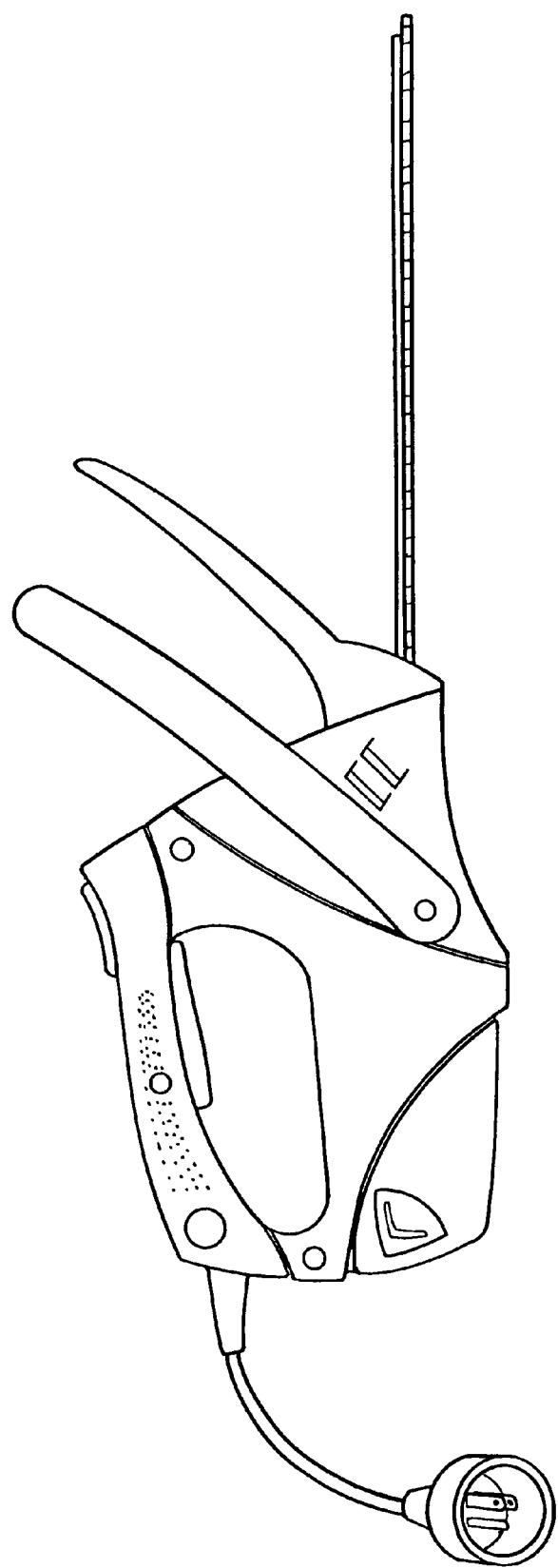
FIG. 3A is a partial side elevation view of a hybrid power hedge trimmer in accordance with an exemplary embodiment of the present invention.
Figure 3B:
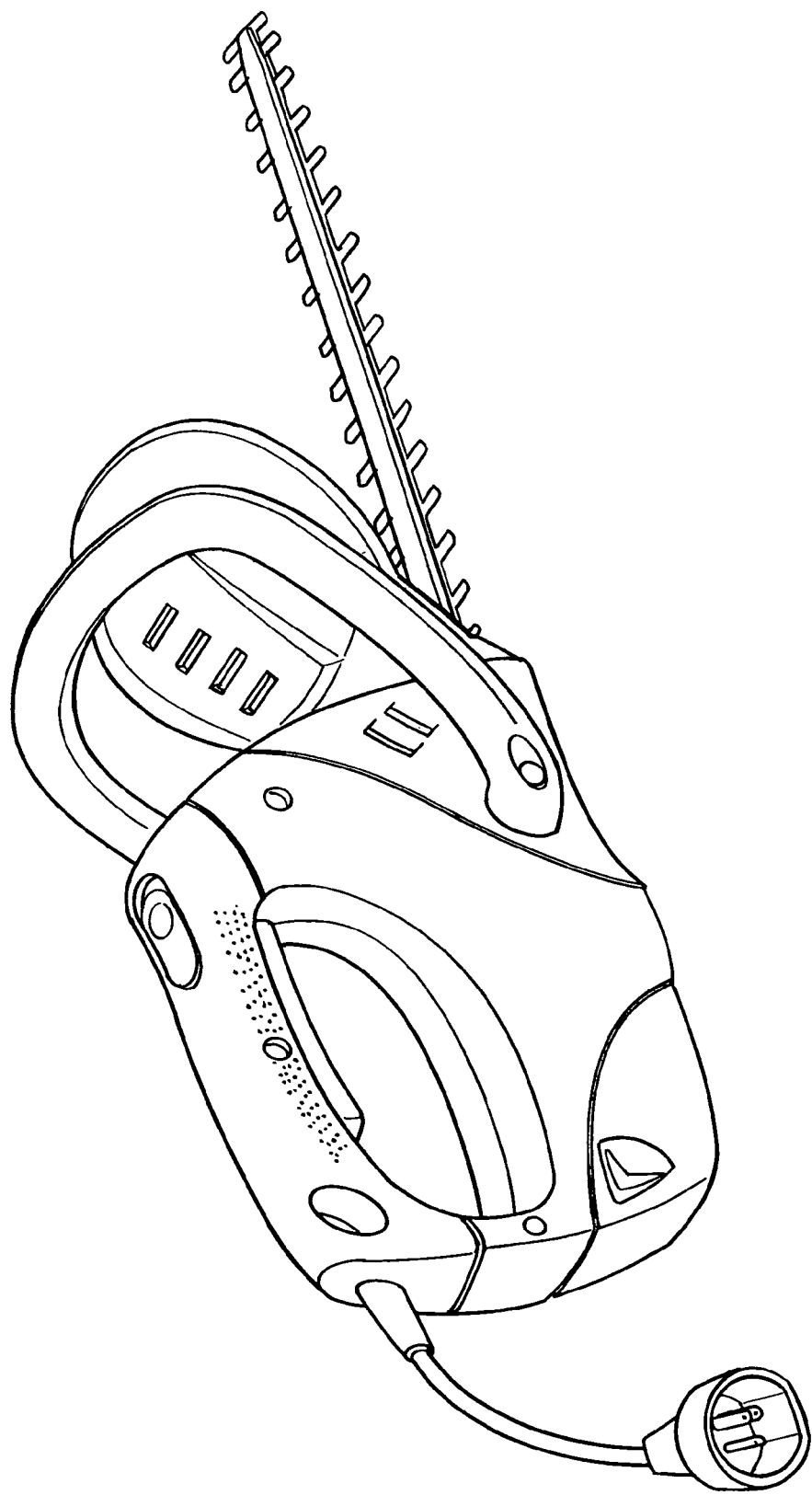
FIG. 3B is a partial perspective view of the hybrid power hedge trimmer displayed in FIG. 3A.
Figure 4A:
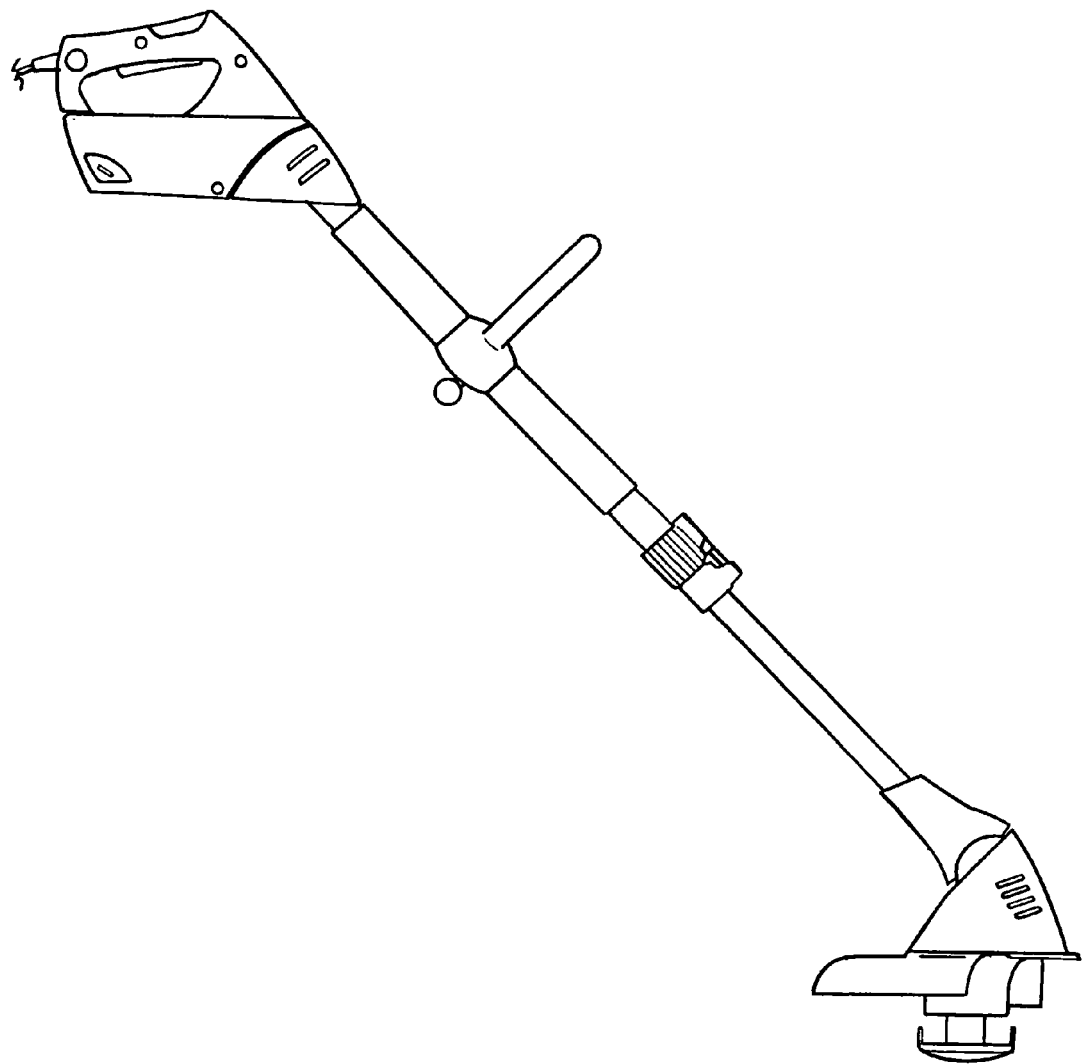
FIG. 4A is a side elevation view of a hybrid power string trimmer in accordance with an exemplary embodiment of the present invention.
Figure 4B:
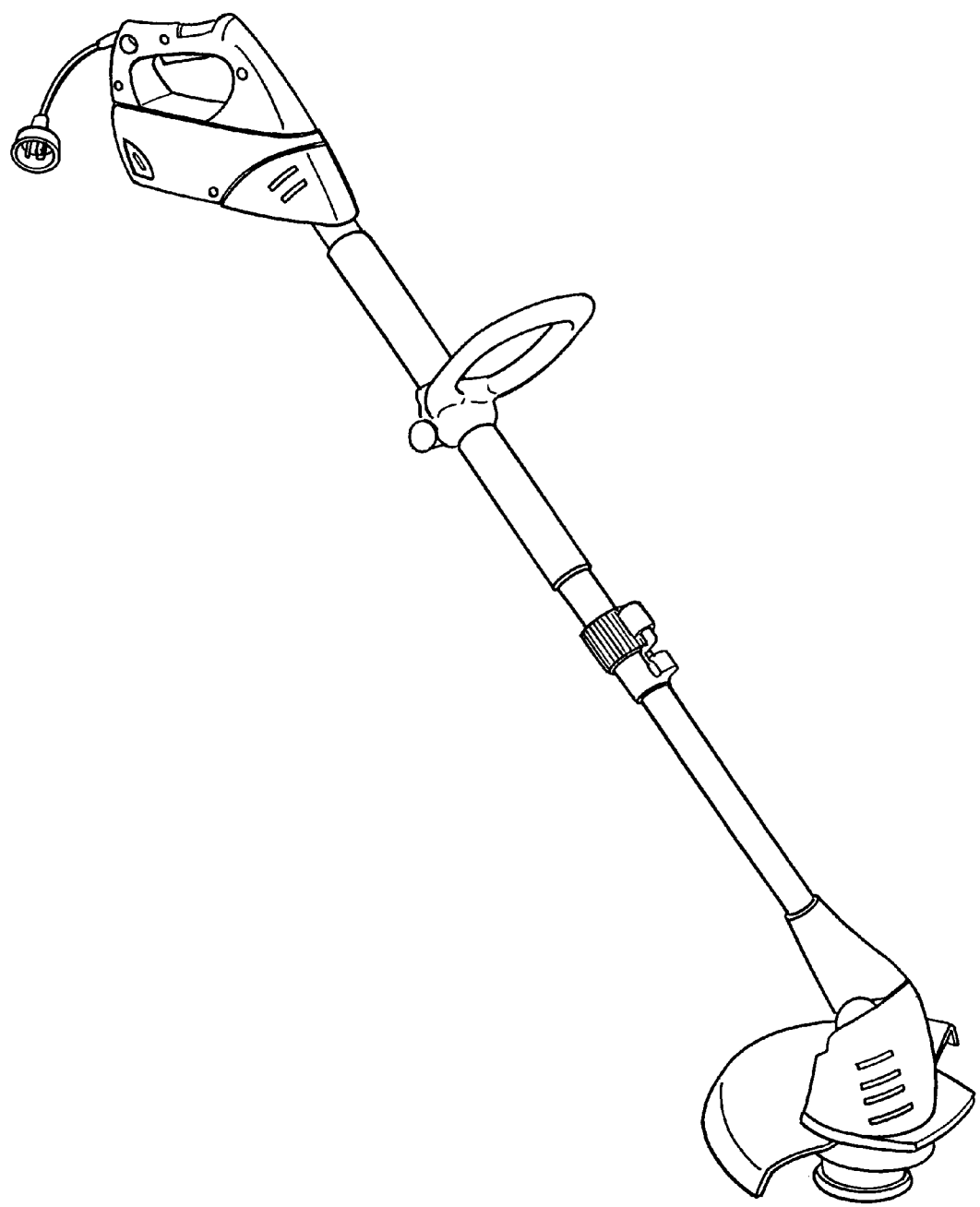
FIG. 4B is a perspective view of the hybrid power string trimmer shown in FIG. 4A.

Referring now to FIGS. 1A, 1B, 2A, 2B, 3A, 3B, 4A, and 4B, hybrid outdoor power equipment (OPE) according to exemplary embodiments of the present invention are shown. The term "hybrid power" or "selectable power" and appropriate variations of the terms indicate an ability to utilize multiple power sources, either in conjunction or separately. For example, in one specific embodiment hybrid power OPE refers to OPE that utilizes DC electric power, AC electric power, or a combination of DC electric power and AC electric power. FIGS. 1A and 1B depict a hybrid power blower, FIGS. 2A and 2B depict a hybrid power chain saw, FIGS. 3A and 3B depict a hybrid power hedge trimmer, and FIGS. 4A and 4B depict a hybrid power string trimmer. OPE may be hand-held devices that assist an individual in performing various tasks including blowing debris, trimming foliage, cutting trees, and other assorted landscaping, home, or work-related processes, and the like. The term "hand-held" may be described as being small, compact, or light enough to be operated with held in the hand or hands.

Such function and structure of the OPE comprise a DC motor to drive a working element, wherein the DC motor is powered by alternative power supplies which include 120 VAC line voltage or DC power supply such as a battery pack. The motor, which drives the working element, and the power supply system of the hybrid electric OPE allows the user to select the power source whether it is AC power supply or DC power supply. In either selection, a power control system or power control module of the electric OPE provides adequate voltage to the motor or motors (when a plurality of motors are utilized). Further, a selection is available for the user of the present embodiment to drive the motor in either a conserve mode or a boost mode. Conserve mode utilizes less power from the power source than boost mode, thereby increasing charge time for each full battery charge under such selection, should the DC operation mode be selected. Both conserve mode and boost mode may be operable in AC operation mode also.

Further design enhancements of the hybrid OPE may comprise the addition of a second electric motor in order to increase the working element productive output of the electric OPE without increasing the working element size. Increasing working element size may be problematic in that the total amount of air resistance or cutting resistance with a larger working element increases substantially the power drain on the battery due to substantial air movement resistance, cutting resistance, and other resistances associated with OPE usage.

The hybrid OPE of the present embodiment incorporates controls near a handle such that they may be readily accessible to the operator. These handles and controls comprise a power selection switch and a boost/conserve switch, both of which may be located on a control box. Integrated within the control box may also be a circuit breaker 28. Also shown with the controls is the AC power line 22 which may be directly plugged into AC line voltage which is typically 60 Hz 120 Volts. The AC power line 22 has a plug receptacle 23 for directly connecting to an extension cord or other device in order to provide AC electrical power.

Hybrid OPE of the present embodiment is designed to be operated on either AC line voltage from an AC power source such as a wall plug or other AC source, or from a DC battery pack in close conductive and operative relationship with the DC motor. The hybrid OPE of the present embodiment is so designed that the operator may operatively select functionality of the hybrid OPE and the motor by either AC or DC power, the DC alternative coming from the battery pack which may be rechargeable. The rechargeable battery may include rechargeable battery technology known in the art, including nickel-metal technology, lithium ion technology, and the like.

Additionally, as depicted in the controls 20, the hybrid OPE with boost and conserve feature of the present embodiment may comprise a boost/conserve switch. The boost/conserve switch provides the functionality of increasing or decreasing the voltage provided to the DC motor, thereby increasing or decreasing the rotational speed of the motor based upon the setting of the boost/conserve switch. The boost/conserve switch may increase or decrease the voltage provided to the DC motor and thereby increase or decrease the actual drain on the battery pack or other power supply due to the current provided to the DC motor.

Turning now to particular embodiments and examples as depicted herein, the present embodiment is directed towards a hybrid OPE which has a boost and conserve feature. In the present inventive hybrid OPE depicted, the hybrid control system allows for the hybrid OPE to be powered from regular household AC line voltage or from a DC voltage battery pack. The battery pack may be designed to have a lower operating voltage available which may be lower than the average peak voltage of the household current. This arrangement may be provided in order to allow the OPE to run in a possible conservation mode in order to preserve battery run time under less demanding conditions. Alternatively, when the hybrid OPE is plugged into AC household current or line voltage or when additional voltage is tapped from the battery pack or from a battery associated with the battery pack, the hybrid OPE of the present embodiment may selectively be operated in a boost or power mode.

It may also be desirable in one of the present inventive embodiments, to provide a battery pack 52 which is easily removable from the OPE. The hybrid OPE may be used without the battery pack so as to be more easily maneuverable and lightweight. It may also be easier to stow the hybrid OPE and charge the battery pack 52 separately or alternatively to charge the battery while the OPE is still in operation. The DC motor may be a permanent magnet type DC motor and may be designed to to receive power from the battery and/or from the hybrid power controller which will be described herein. The motor may be designed to further provide a fan to promote cooling of the DC motor thereby providing air circulation across the brushes and through the motor. Alternative embodiments with multiple motors or with multiple commutators selectively operating in series or in parallel may also be provided.

When the hybrid OPE is not in the boost or power mode, the hybrid OPE may be considered to be in a conserve mode. While in conserve mode, the working elements of the hybrid OPE may have reduced velocity as compared to the working element velocity when the hybrid OPE is in the boost or power mode. Thus conserve mode significantly increases the battery pack charge run time when the battery pack is in operation and the power selection switch 21 is selected in DC mode. In such an instance, 12 to 60 volts may be provided to the DC motor. In one specific embodiment, the battery pack 52 comprises five batteries connected in series, each of the batteries providing 12 volts. Alternatively, the boost/conserve switch 26 may be engaged while the power switch 21 is in the DC mode, and an additional or secondary battery may be integrated with or separated from the battery pack 52 and may be brought in series with the battery pack 52 power supply thereby increasing the voltage to 66 or 72 volts, depending on the desirable operating conditions. Variations may be provided in the configuration and implementation while running in DC mode since the battery pack depicted herein is exemplary and for descriptive purposes only. Many other embodiments may be utilized including bringing batteries in parallel, series, providing additional power sources, and the like.

While an example of the conserve/boost switch has been provided in the operation of DC mode, alternative embodiments may be provided while operating in AC mode. Such embodiments may comprise increasing the step down voltage from the power supply controller as presented to the DC motor or alternatively bringing in series the secondary battery while also operating in AC mode, thereby increasing the DC voltage presented to the motor which increases working element velocity. Thus the power supply of the present embodiment may generate DC power to the motor, wherein boost or increased voltage may be derived from either the power supply by various techniques known and depicted or by providing additional voltage from the battery pack or secondary battery, which may result in increased operational speed of the motor.

One other aspect of the present embodiment of the hybrid OPE of the present embodiment is the ability to provide a user-selectable power supply to a DC motor driving the working element. A user-selectable alternative power supply or power selection switch is provided in order that the DC motor may be user switchable from power sources, namely from an AC 120 volt 60 Hz power input representing line voltage (should an extension cord or line voltage be readily accessible) to a battery pack DC voltage provided on board of the OPE, or vice versa. Both power supplies may be selectable by the operator and both power supplies drive the same motor.

Figure 5:
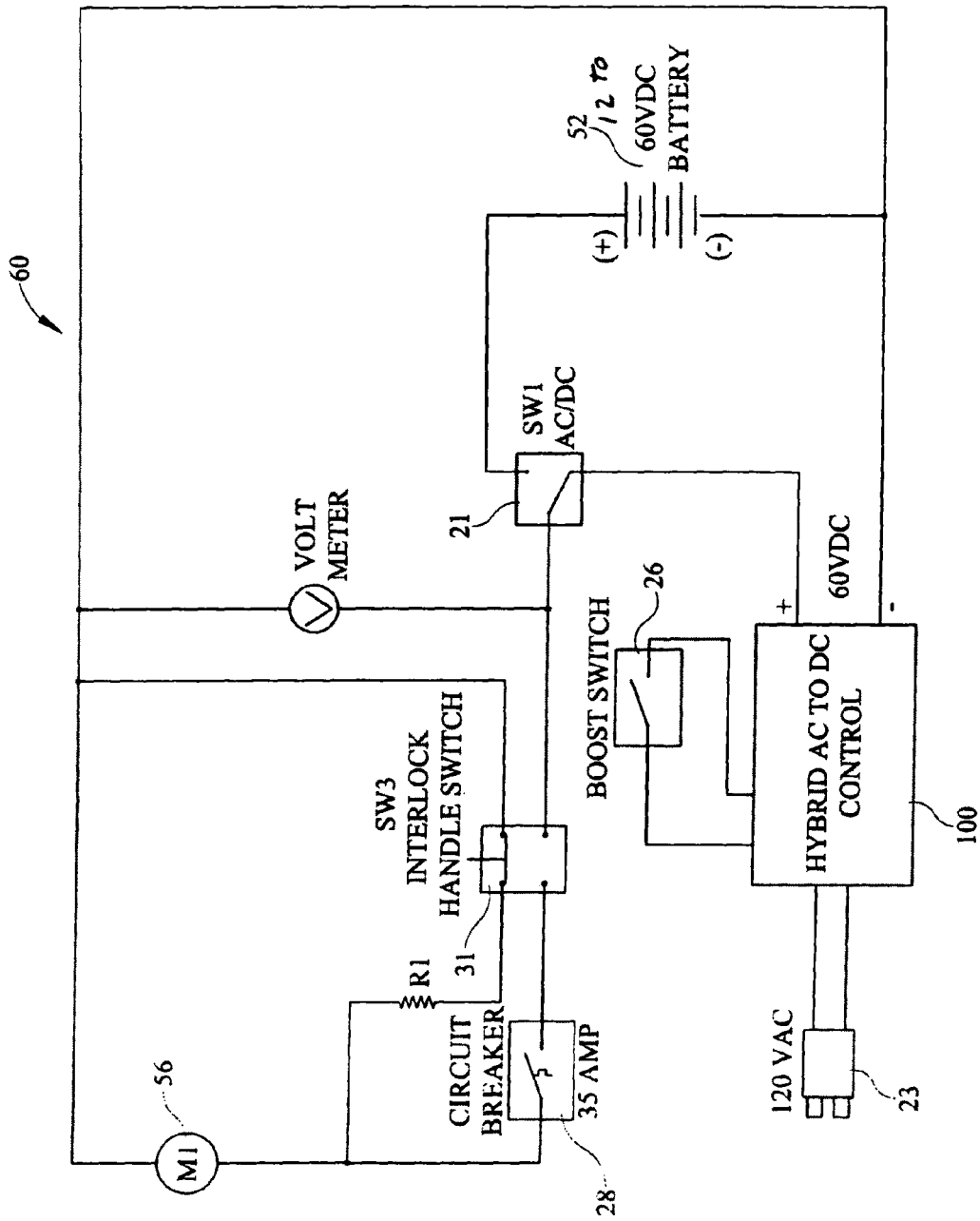
FIG. 5 is a circuit diagram of a power control circuit in accordance with an exemplary embodiment of the present invention.

Referring now to FIG. 5 an exemplary embodiment of the present invention is shown, wherein a power control circuit 60 is depicted providing, among other things, the boost and conserve power features of the present embodiment. The DC electric motor 56 is shown in electrical connectivity with the various power control circuit elements which comprise the handle switch 31, for example a double pole double throw switch, a circuit breaker 28, a boost/conserve switch 26, for example a single pole double throw switch, a power selection switch 21, for example a single pole double throw switch, a battery pack 52 which is depicted as a 60 volt DC battery pack (providing 60 volts to the motor 56 when operatively selected by the power selection switch 21), and a hybrid AC/DC controller 100 which serves as a power inverter or step down controller for converting the line voltage 120 VAC presented by the plug. In this present example, the boost/conserve switch 26 provides an increased voltage to the motor 56 by modifying an input resistive value or timing signal value to a pulse width modulation control unit, which will be described with reference to FIG. 6, in order to alter the gating of an insulated gate bi-polar transistor (IGBT) thereby affecting the voltage wave form at the output of the power inverter or step down controller. An in rush current limiter may be provided as shown in order to prevent oversaturation of the circuit during the initial startup and energizing of the circuit. A rectifier may be utilized to rectify the voltage from AC to DC. For example, the rectifier may be a full bridge rectifier. However, many different forms of providing a step down controller are known in the art and the depictions set forth are not to be considered unduly limiting.

The exemplary embodiment depicted in FIG. 5 comprises an AC wall plug 23 which connects to the hybrid AC/DC controller 100 (acting as a voltage converter) which in turn is connected to a single pole double throw power selection switch 21 and a single pole double throw boost switch 26. The boost switch 26 is the boost/conserve switch depicted and described herein. When selected, the boost switch 26 may provide resistive loads to the CMOS micro-controller for the pulse width modulation control. When not selected, the boost switch 26 opens the contacts. The power selection switch 21 toggles the DC motor 56 between the output of the step down controller and the DC battery voltage source. The output of the power selection switch feeds a voltage meter which may be connected in parallel with the double pole double throw inter-lock handle switch. The handle switch toggles between shorting the DC motor through resistor to ground and connecting the output of the power selection switch through a circuit breaker to the DC motor.

Figure 6:
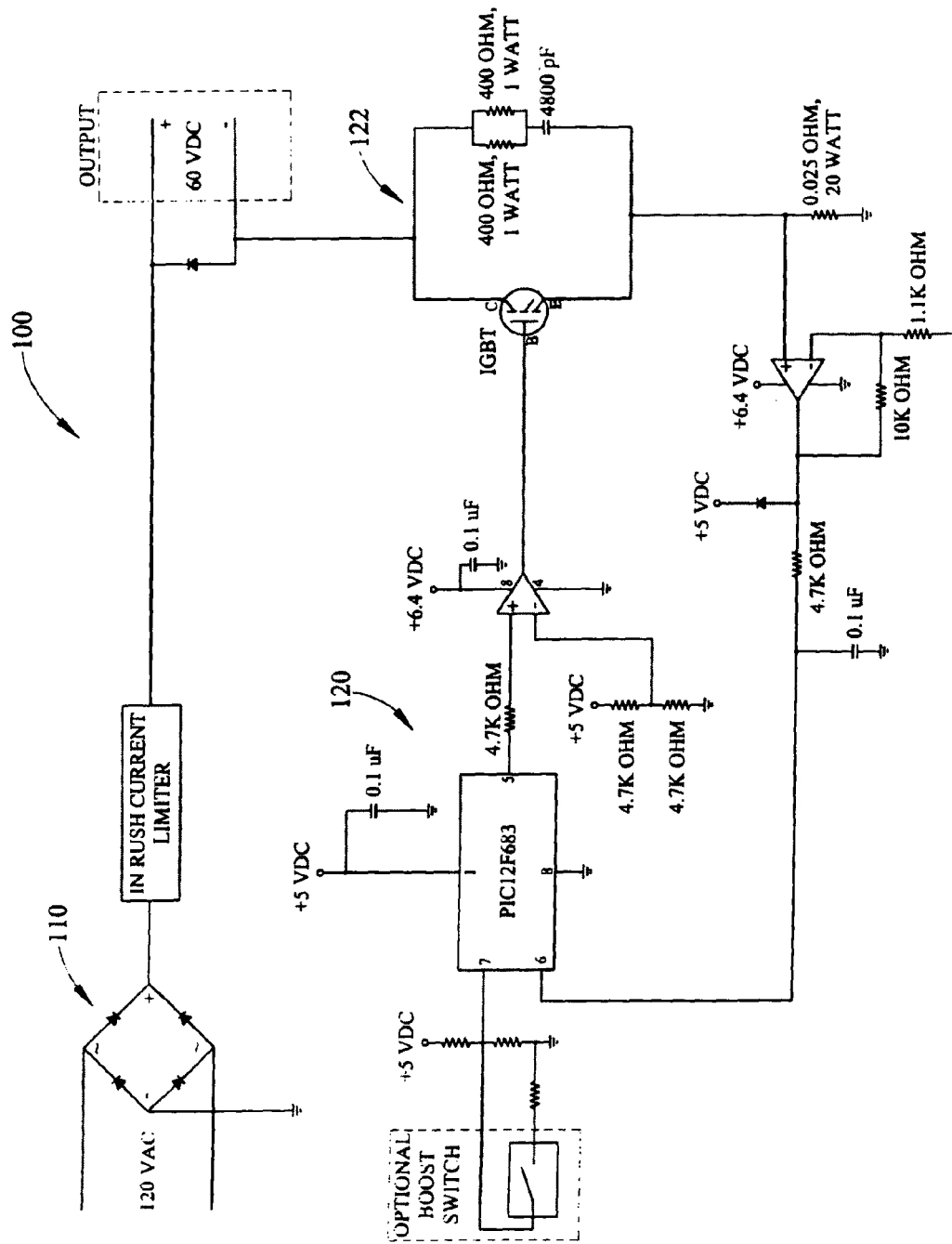
FIG. 6 is a circuit diagram of a hybrid AC/DC controller in accordance with an exemplary embodiment of the present invention.

Referring now to FIG. 6, a hybrid AC/DC controller 100 according to one embodiment of the present invention is shown. The boost switch may provide increased voltage to the motor when the hybrid OPE of the present embodiment is plugged in and running off of line voltage AC power. Such boost may be effectuated by modifying the pulse width modulation control 120 through alteration of the input resistive load at input pin 7 of the micro-controller shown. More description of the power inverter and/or step down controller of the presently inventive power supply will be set forth herein.

Figure 7:
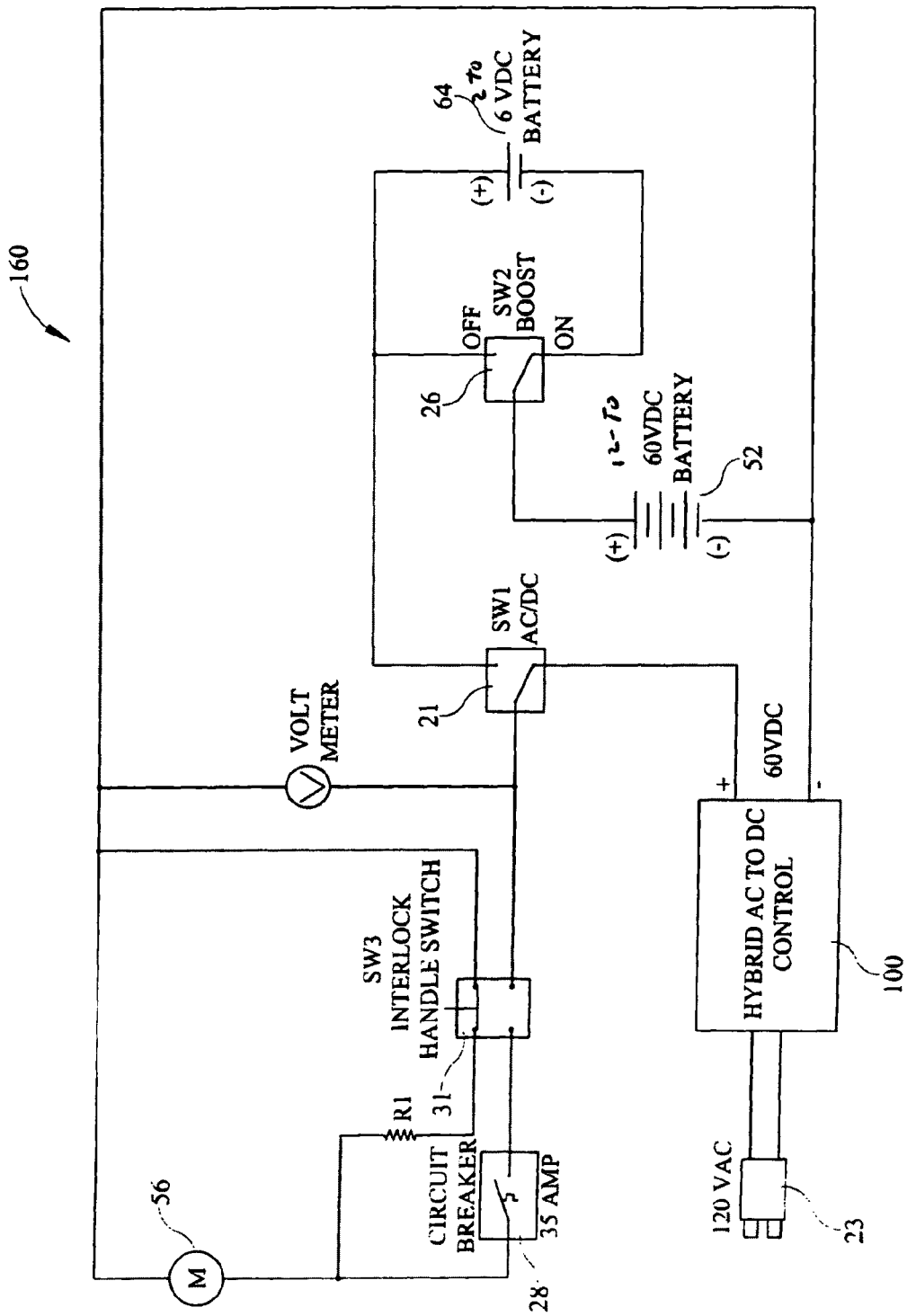
FIG. 7 is a circuit diagram of a power control circuit in accordance with another exemplary embodiment of the present invention.

Referring now to FIG. 7, an additional embodiment for the power supply circuit of the present invention is shown. An AC wall plug 23 connects an AC voltage to the hybrid AC/DC controller 100 which is connected to the power selection switch 21. The power selection switch 21 allows toggling between output of the AC/DC hybrid controller 100 when in the AC selection and the boost/conserve switch 26 and the output of an alternative power source when in the DC position. The boost/conserve switch 26 toggles between shorting the positive side of the battery source 52 directly to the boost switch (when in an "off" position) and connecting the battery source 52 in series with the secondary or boost battery 64 (when in an "on" position) before connecting to the power selection switch 21 (AC/DC switch). The power selection switch 21 then feeds a voltage meter V which is connected in parallel with an inter-lock handle switch 31, here depicted as a double pole double throw switch. The inter-lock handle switch 31 toggles between shorting the DC motor 56 through a resistor R1 to ground and connecting the output of the power selection switch 21 through the circuit breaker 28 to the DC motor 56.

Additional voltage is provided to the DC motor 56 when the hybrid OPE is positioned in the DC power selection option and the boost/conserve switch 26 is activated to the "on" position, thereby providing an additional 2-6 volts DC to the 12-60 volts DC provided by the battery 52. A secondary battery 64 provides additional voltage to the DC motor 56 through actuation of the boost/conserve switch to the "on" position, thereby increasing the motor speed and corresponding working element speed. Thus, when the hybrid OPE is in DC battery operation mode, the power control circuit or power supply 160 allows an operator to increase the operating speed of the motor corresponding to the additional voltage provided by the secondary battery 64. Controls are also provided allowing the operator to select between the operation of the motor through the use of line voltage, such as 120 VAC, or through the use of the battery pack. Depicted herein is a secondary boost battery 64 which is provided as separate to the battery pack 52, but it may be more practical to provide a secondary boost battery 64 in combination with and contiguous to the battery pack 52. Thus, the secondary boost battery 52 may be continuous with the battery pack 52 or may be separate, but the secondary boost battery 52 may add additional voltage to the motor 56 when the operating output voltage of the power supply as presented to the motor is modified by the voltage of the secondary boost battery 52.

The hybrid AC/DC controller 100 as shown provides both power inverter and step down capabilities in order to modify and regulate the 120 VAC to the proper voltage required to run the DC motor. However, these functions are provided to be only exemplary. The controller 100 acts as an inverter via rectifier and also is suitable to properly modulate the voltage via the PWM controller and associated gates. The power inverter and step down controller may be part of the power supply or power control module as needed, or may be excluded, depending on the voltage characteristics of the input line voltage and the requirements of the electric motor implemented in the present design.

Figure 8:
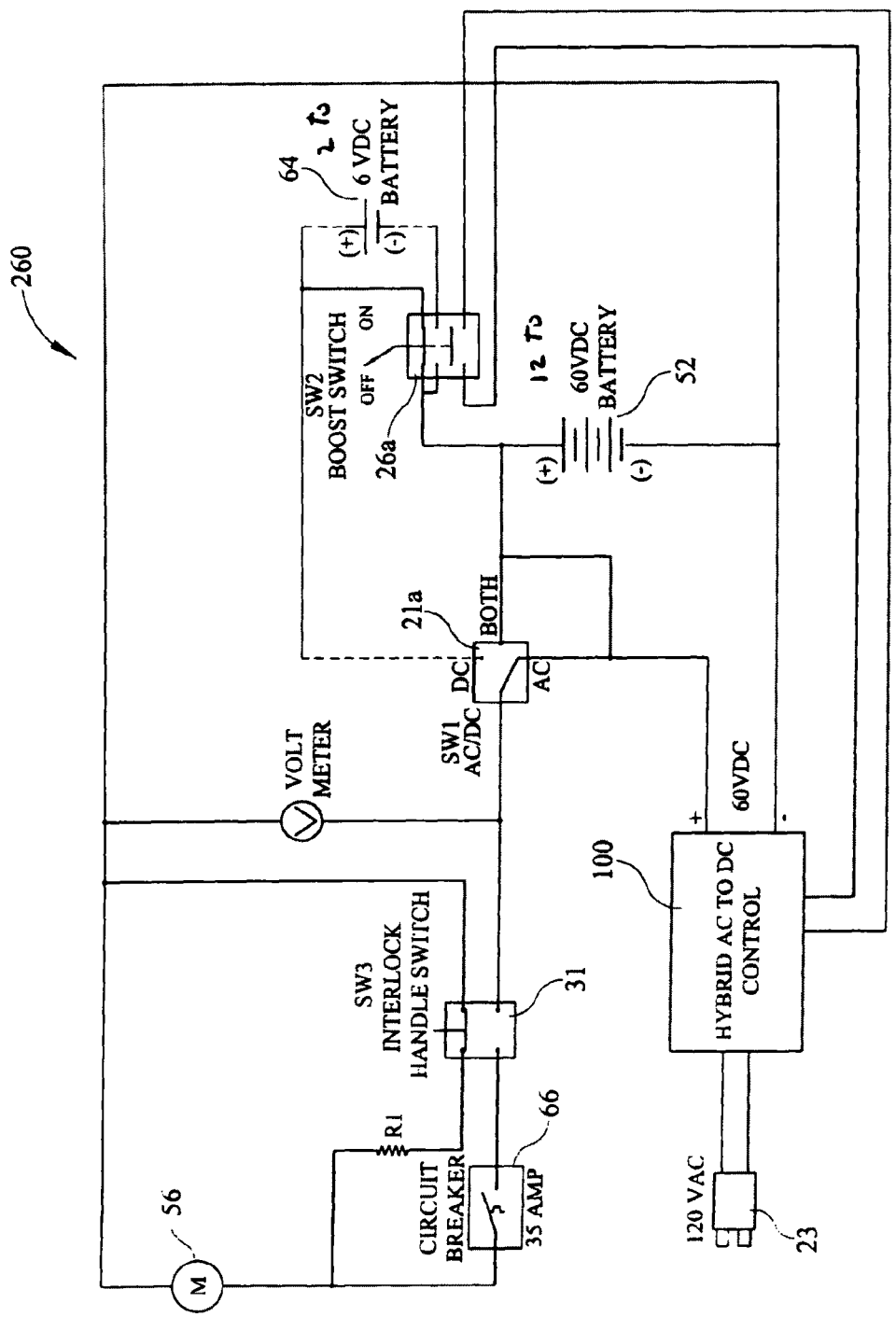
FIG. 8 is a circuit diagram of a power control circuit in accordance with a further exemplary embodiment of the present invention.

Referring now to FIG. 8, an alternative configuration for the power control comprises the power supply circuit 260. AC line power, such as 120 VAC, may be provided to supply power to the motor while a 12-60 volt DC battery 52 may be provided as operatively selectable by a user through the power selection switch 21a. As depicted in this example, the boost switch 26a is operative to bring in series a secondary battery 64 which may provide 2-6 volts DC, for example, when set in "BOTH" mode with the voltage provided by the hybrid controller 100 of the power supply or the battery pack 52. The secondary battery 64 may be in combination with the battery pack 52 or secondary and separate thereof. Additionally, as shown in the example, the 2-6 volt battery is brought into the circuit in series with the DC output of the hybrid control 100 or with the battery pack 52. Also, many variations for the structure, assembly, and actual value of the secondary battery 64 for all embodiments may be provided in order to increase the voltage to the motor 56. As depicted in FIG. 8, the power selection switch 21a further provides for three settings allowing user-selectable options of powering the DC motor 56 by 120 VAC, direct battery pack connection, or a hybrid BOTH connection. When operating in the strictly 120 VAC mode, the hybrid AC to DC control 100 regulates and modulates the voltage to properly supply voltage to the DC motor 56. Alternatively, the power selection switch 21a provides for a DC operation whereby the motor 56 is operated by the battery pack 52. A third option is placement of the power selection switch 21a into the BOTH mode wherein the battery pack 52 may contribute a limited amount of power. For instance, voltage drops caused by increased load on the motor may result in increased contribution from the battery pack 52. Additionally, as depicted in the embodiment shown, the boost/conserve switch 26a may be provided for contribution of additional voltage from the secondary battery 64 when the power selection switch 21a is placed in either the BOTH or DC mode. In such an instance, the secondary battery 64 is brought in series with the voltage contribution from either the power supply or the battery pack 52.

Figure 9:
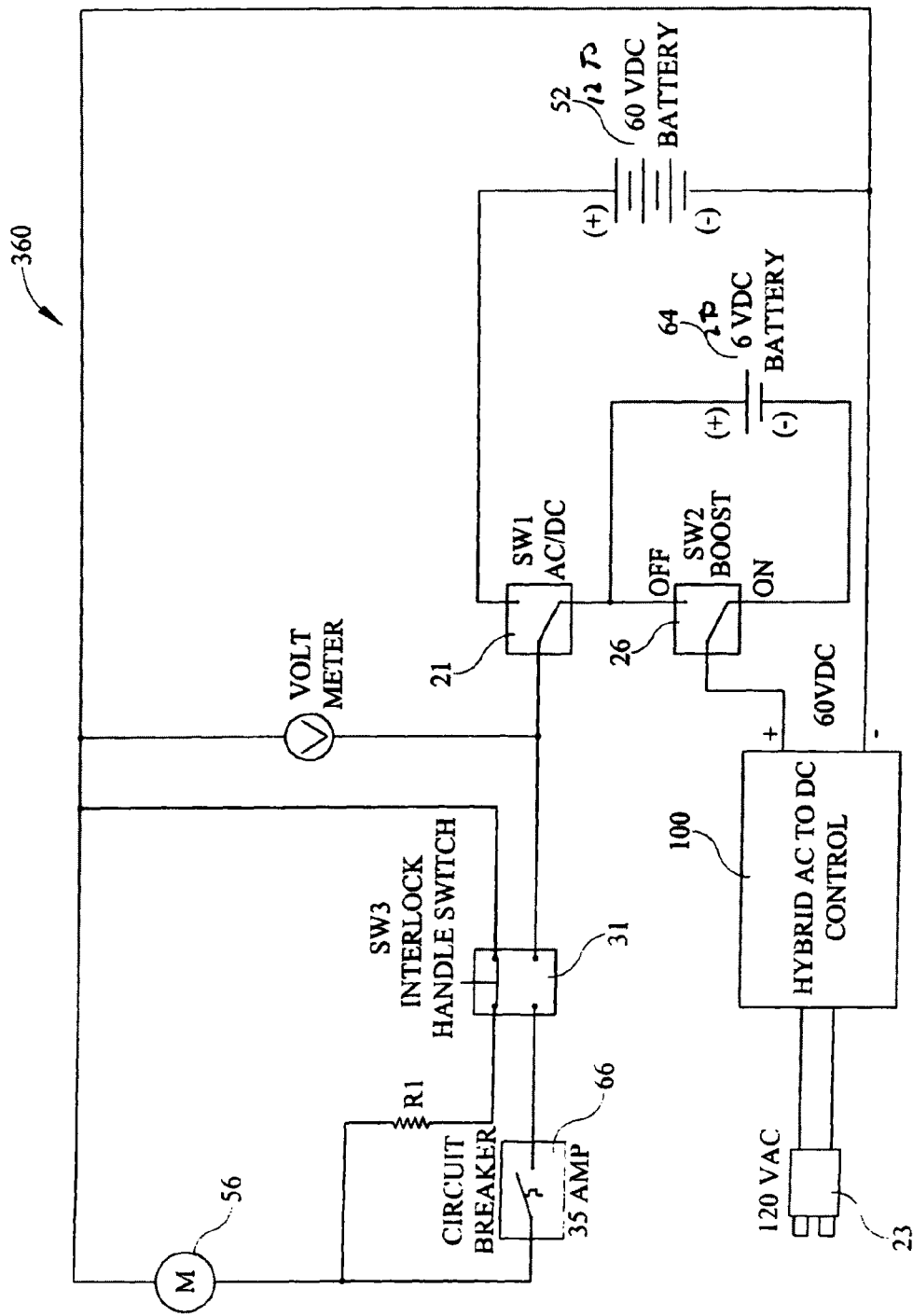
FIG. 9 is a circuit diagram of a power control circuit in accordance with yet another exemplary embodiment of the present invention.

Referring now to FIG. 9, an alternative construction and embodiment of the power control and supply circuit 360 is displayed. The power supply circuit 360 comprises a 120 VAC wall plug 23 which connects to the hybrid AC controller 100 which in turn is connected to an exemplary single pole double throw boost switch 26 thereby allowing the circuit to bypass boost battery 64 when boost switch 26 is in an "off" position or to connect to the boost battery 64 when boost switch 26 is in an "on" position. Additionally, the circuit continues to an exemplary single pole double throw power selection switch 21 which toggles between output of the boost switch 26 when in the AC position and the output of the DC battery voltage source when in the DC position. The power selection switch 21 feeds a voltage meter V which is connected in parallel with an exemplary double pole double throw inter-lock handle 31. The inter-lock handle switch 31 toggles between shorting the DC motor 56 through a resistor R1 to ground and connecting the output of the power selection switch 21 through a circuit breaker 66 to the DC motor 56. In this example of the power control circuit 360, the boost or secondary battery 64 is brought in parallel with the battery pack 52 or in parallel with the output of the hybrid controller 100, which may increase the current capacity for the motor when in higher speed or boost mode.

Multiple variations of power control module or power supply 60, 160, 260, 360 may be provided and are described herein. When mentioned herein as a hybrid power controller, power supply, power control module, step down controller or hybrid controller, these terms are collectively meant to imply providing electricity to the motor. No single element set forth in the exemplary embodiments provided herein, namely the power supply elements of the switches, battery packs, circuit breakers, inverters and modulation elements are to be unnecessarily applied to the interpretation of these terms. In fact, the power supply circuit collectively described herein may be implemented through the use of a significant number of alternative structures for regulation, modulation, controlling or limiting the proper voltage or power to the motor implemented in the examples herein. No unnecessary limitation should be interpreted from the particular use of the term controller, inverter, regulator or regulation or modulation as depicted herein, as one of ordinary skill in the art would be enabled through the teachings hereof to provide significant variations to the particular embodiments and examples disclosed in the figures and stated in the described examples.

Referring now to FIG. 6, an exemplary power inverter and in combination step down controller (hybrid controller 100) is shown. The step down controller 100 acts as a portion of the power control module, wherein the controller 100 receives as input 120 volts AC which, in this example, is inverted utilizing a full bridge rectifier. A number of different inverter designs may be used in order to provide voltage rectification. As depicted in the present example, a full bridge rectifier may be utilized but this may be replaced with other known inverter circuitry as is available and known in the art. An in rush current limiter is provided to prevent current surges during initial loading of the circuit and prevent further damage or over-saturation.

Additionally, an optional boost switch may be provided. The boost switch may be operable to modify the input to the pulse width modulation controller which defines the voltage output for the step down controller. As shown, a micro-controller is utilized in order to set the appropriate pulse rate for the PWM control and feeds into the insulated gate bi-polar transistor (IGBT) which provides the switching or pulse gate driver for the DC output of the hybrid AC/DC control. Thus, the hybrid controller incorporates, but does not necessarily require, the utilization of voltage rectification and a voltage rectifier as is necessary in combination with variations of voltage modification such as a pulse width modifier. However, multiple options for step down voltage and control are known and may be utilized such as diode controls, triac controls, MOSFET controls and the like. Many of these are well known in the art and may be utilized in the step down controller and power inverter in combination as described herein. Additionally, as depicted, the pulse width modulation control circuit receives as input in one embodiment the ability to modify the voltage by use of the boost switch. The boost switch in this embodiment modifies the reference signal fed into pin 7 of the micro-controller for the reference value which operates to modify the gating of the IGBT and therefore, the voltage characteristics of the DC output depicted. The boost mode depicted provides the alternative function of a boost (for example, a voltage increase) integrated with the power inverter and step down controller. The boost switch can be alternatively provided in many connections and this integrated boost switch may be integrated with many of the other alternative embodiments.

As is known, many variations of a step down controller and inverter may be utilized. In general, the power control module of the present embodiment may utilize power input of 120 VAC and may incorporate many switches and controls for electrically connecting the DC motor to either the 12-60 volt DC battery or the DC output of the hybrid power controller 100. For example, the power control module may comprise a power source switch which effectively has a first power input as a connection of the power control module of the DC output of the power inverter and step down controller or has a second power input the as a 60 volt DC of the battery pack. The power selection switch provides the ability of a user to switch between 120 VAC power and 12-60 VDC power from the battery pack. The power selection switch may be directly connected to the DC motor which operates the working element of the hybrid OPE. The DC motor may be operationally modified by utilization of a boost switch which is optional in many embodiments depicted herein. The boost switch allows a boost/conserve function, which changes the voltage applied to the DC motor from 12-60 volts by an incremental value. This boost/conserve function may provide the ability through the many embodiments disclosed to increase the voltage of the power control module and thereby increases the speed of the working elements. As indicated, this may be desirable for short periods of time, such as during increased loads on the motor. The boost/conserve feature may comprise a first power output of the power control module, the first power output higher than a second power output, the second power output being a conserve feature wherein the DC motor draws less current and thereby increases the battery life charge of the battery pack. However, such feature does not have to be implemented, as is clearly seen herein, only with the use of DC operation and DC power input. For instance, the increase speed (boost) feature may be implemented also with 120 VAC wall power by increasing the DC voltage output of the hybrid AC/DC control or by adding supplemental DC power supply from the operating batteries, whether the primary or secondary.

Figure 10:
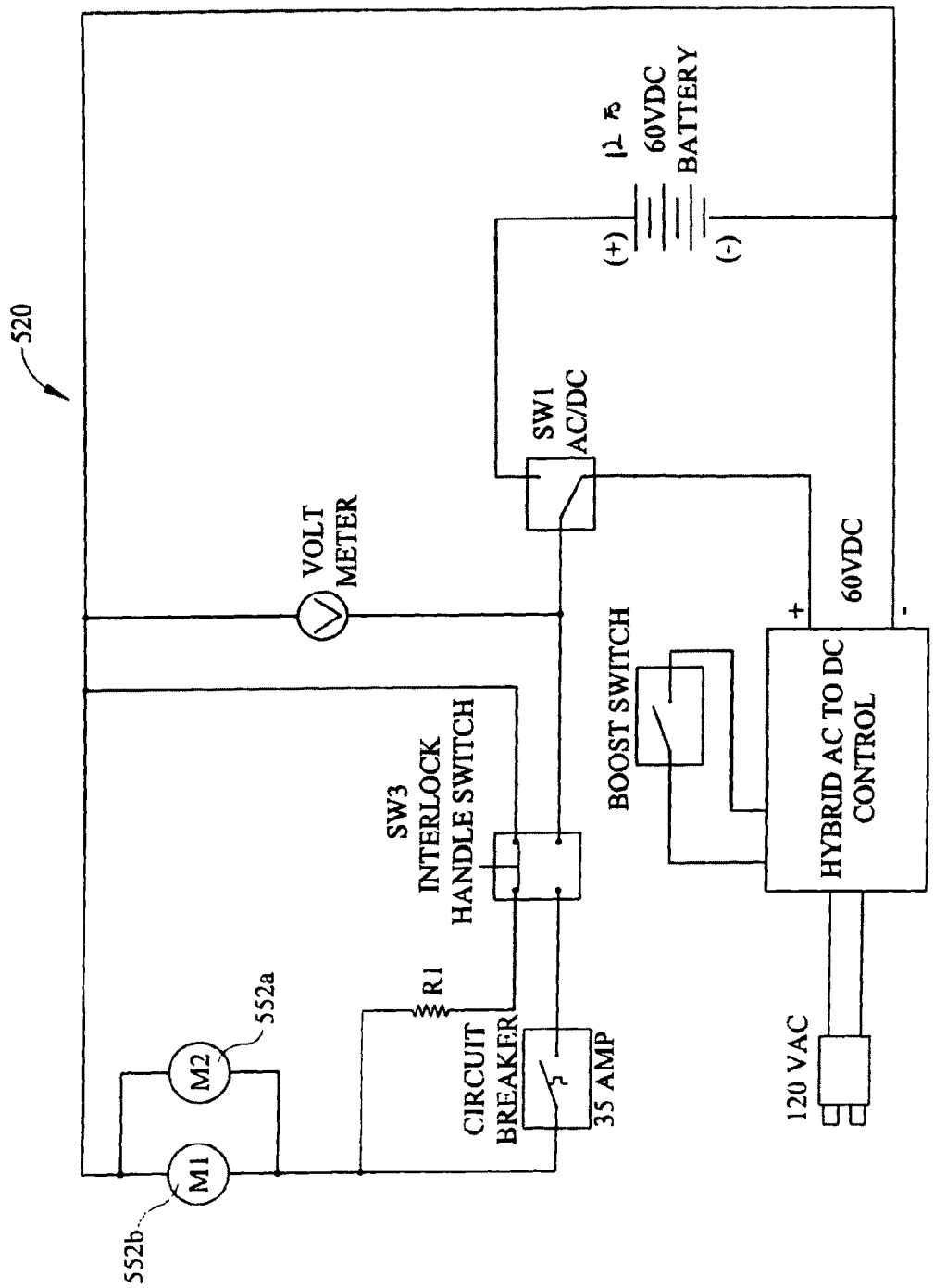
FIG. 10 is a circuit diagram of a power control circuit providing two motors in parallel in accordance with an exemplary embodiment of the present invention.
Figure 11:
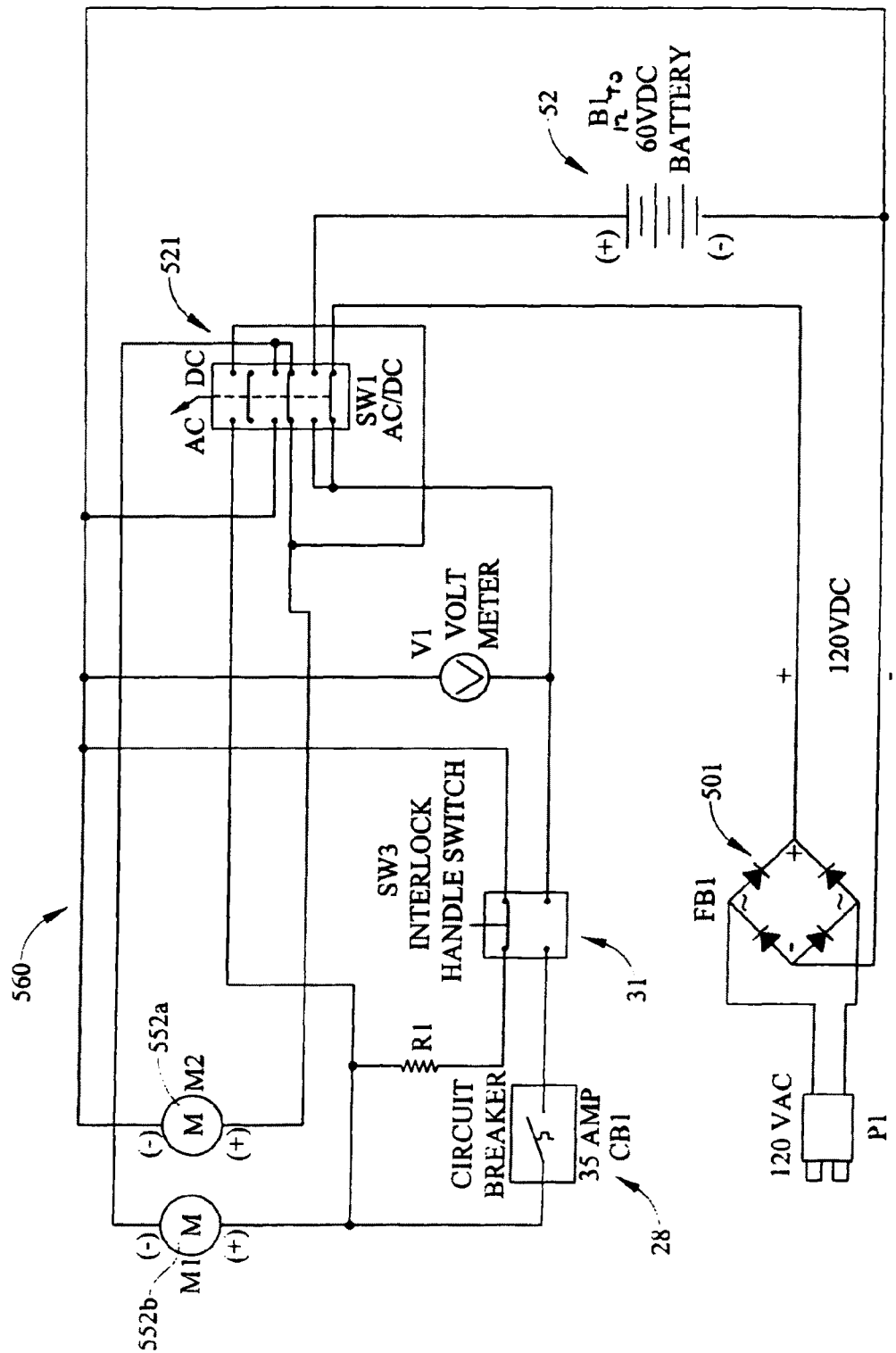
FIG. 11 is a circuit diagram of a power control circuit providing two motors optionally in parallel or series in accordance with an exemplary embodiment of the present invention.

An alternative embodiment of the power control module in accordance with exemplary embodiments of the present invention is depicted in FIGS. 10 and 11. The power control module depicted in FIGS. 10 and 11 utilizes a dual DC motor configuration, wherein the motors may contributorily power the working elements of hybrid OPE. Dual motor alternative construction may substantially use similar power control circuitry with the modification for series or parallel connection of the DC motors to the power supply voltage. It may be desirable to provide the DC motors with either 120 VAC line power, which is current rectified, or with the battery pack supplying DC electrical power. By utilizing two motors as opposed to a single motor with an increased rotational speed, significant power savings may be experienced. Similarly, dual motors may significantly reduce the required run time lengths for the power supply battery as well as power consumption in both DC and AC operations. Additionally, as is known in the art, when using dual motors, such dual motor implementation may preferably not be used in series in conjunction with battery operation due to the motors running at half speed, i.e. sharing the battery pack supplied voltage in series. Thus, in preferred implementation, although not necessarily required, for dual motor use, the DC electric motors may be preferably placed in parallel (as shown in FIG. 10) in certain operations, such as when operated by the battery pack, and possibly in others, such as when connected to higher line voltage. However, the DC motors may be placed in either operation (series or parallel configuration) as is deemed necessary. Also, power usage may not become an issue when providing line voltage through the hybrid AC to DC controller wherein the AC current is rectified for operation of the DC motors.

A circuit breaker may be provided in combination with the handle switch as previously described in order to operationally connect and disconnect the motors as selected by the user. Further, an AC/DC operational switch may be provided for selection of either power supply, either AC line voltage or DC battery power supply as previously described. Further, a hybrid AC/DC controller may be utilized to implement rectification of the 120 VAC to adequate supply of DC current to the motors. Further, the boost switch may be provided in combination with the hybrid controller or separately as previously described as combinations of these individual elements may be selected by one of ordinary skill in the art and generally is considered to be taught within the operational specifications hereof.

Both motors are depicted in parallel combination with the motors receiving approximately 60 volts from the power supply. When the motors are in such parallel connectivity, as one motor is loaded disproportionately (due to various factors including air resistance and vegetation and cutting resistance), the other motor slows down due to the reduced power available from the battery. For example, the reduced power can be caused by internal resistance and higher amperage of the power supply. Such self adjustment of the motor, and hence working element speeds, provides an automated self regulation of both motors, which may provide the user with increased OPE reliability and consistency.

Referring now to FIG. 11, a power control module in accordance with a further exemplary embodiment of the present invention is depicted. The power control module depicted in FIG. 11 utilizes a dual DC motor configuration, wherein the motors may contributorily power the working elements of hybrid OPE. The configuration of the DC motors is selectable by a user. For example, the user may select either AC or DC operation which places the two motors in either series or parallel configuration, respectively. When in DC mode, the battery supplies constant current and may result in better performance of the motors. Further, when placed in DC mode, the motors are in parallel and as one motor is loaded disproportionately the second motor may slow down due to the reduced power available from the battery pack caused by the internal resistance of the power supply design and motor configuration and higher amperage.

The power supply and control circuit in FIG. 11 indicates that the dual DC motors are connected to the output of the AC/DC power selection switch 521 which toggles the power supply of the circuit from the full bridge rectifier 501 when in the AC position and to the DC battery source 52 when in the DC position. The output of the power selection switch 521 feeds the voltage meter shown which is connected in parallel with the interlock handle switch (double pole, double throw in this embodiment). The handle switch toggles between shorting the DC motors through a resistor R1 to ground and connecting the output of the power selection switch, a three pole double throw switch in this disclosed embodiment, through circuit breaker to the dual DC motors. When the power selection switch 521 is in the AC selection position, the dual motors M1 and M2 are connected in series thereby splitting the voltage output of the rectifier. In such operation, the full bridge rectifier may provide 120 VDC with 60V the seen by each motor. When the AC/DC power selection switch is in the DC position, the motors M1 and M2 are connected in parallel thereby each sharing in the DC voltage output of the battery pack. The battery, being a constant current power supply, may provide better performance of the DC motors M1 and M2 in parallel and thus the connection as is described may be provided with the capability of switching between parallel and series connectivity of the motors M1 and M2 depending on the power source. Further, a full bridge rectifier or possibly other current rectification is depicted wherein the 120 VAC may be an input into a hybrid controller (not depicted as previously shown for simplicity). The full bridge rectifier in this embodiment may readily be replaced by known current rectification circuitry which have been previously disclosed herein or which are known in the art. Thus, the rectifier depicted may be replaced by other current rectification means to rectify the current from AC to DC. These known systems include but are not limited to pulse width modulation which may readily be implemented herein.

When in AC mode as selected from the user-selectable power selection switch 521, the total current going through many of the switches and electronic circuit elements presented herein may be one-half of that in the parallel or battery mode given the embodiments depicted as a result of the rectification of the current and positioning of the loads. In other words, as shown in FIG. 11, the battery pack provides 12-60 VDC which is shared by the dual motors in parallel, whereas the AC input line provides 120 VDC to be split by the dual motors in series. The response to uneven loading also may be more desirable as previously described in parallel as opposed to in series mode since, when in series mode, as one motor is disproportionately loaded and slows down, the other motor will speed up. The actual speed modification of the motors in series however may be mitigated due to the nature of the air resistance to the working elements.

Figure 12:
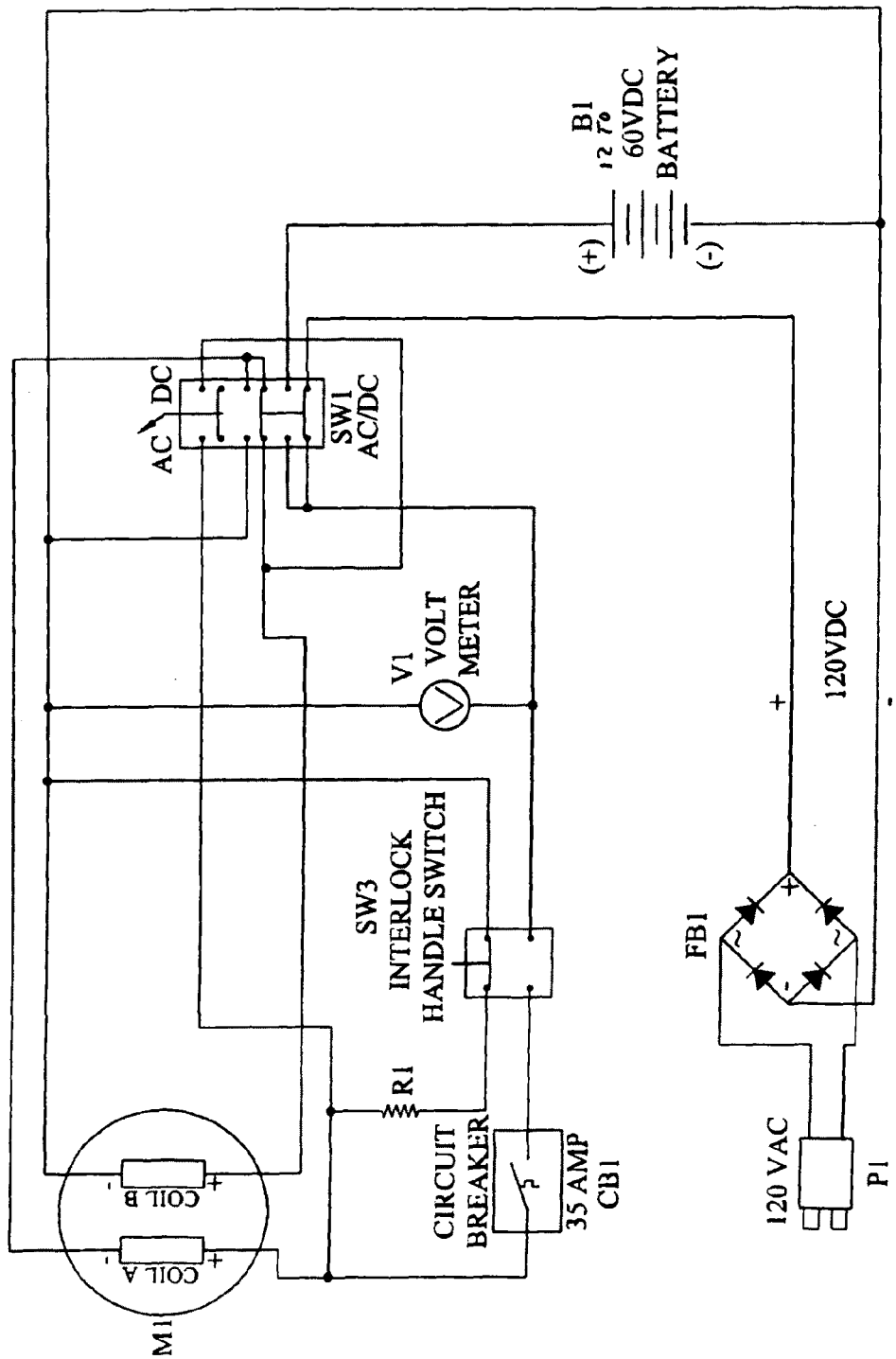
FIG. 12 is a circuit diagram of a power control circuit providing a motor with dual coil commutation optionally in parallel or series in accordance with an exemplary embodiment of the present invention.

In the configurations of the dual motor design depicted in FIGS. 10 and 11, the ability and functionality of the boost/conserve features from the single motor embodiments (described in FIGS. 5-9) may still be enabled. For instance, the working element speed for both motors may be reduced in a conserve mode, particularly when operating off of the DC battery power supply in order to increase charge life. As shown in FIG. 12, a boost/conserve switch and feature may be implemented in conjunction with the hybrid controller. However, many differing combinations of the boost/conserve feature previously described may be well understood to be applicable to either design and power supply shown. In conjunction with the power supply and control depicted in either embodiment, a secondary battery pack may be utilized as discussed herein to increase the voltage output of the DC operation and power supply thereby increasing the working element speed for both motors while also allowing battery use to be conserved in a second state thereby increasing overall run life per charge. Alternatively, increased voltage may be provided directly from the hybrid controller as depicted when drawing power from AC power supply. Similarly alternative constructions may be implemented in the embodiment shown in the various figures and embodiments.

Figure 13:
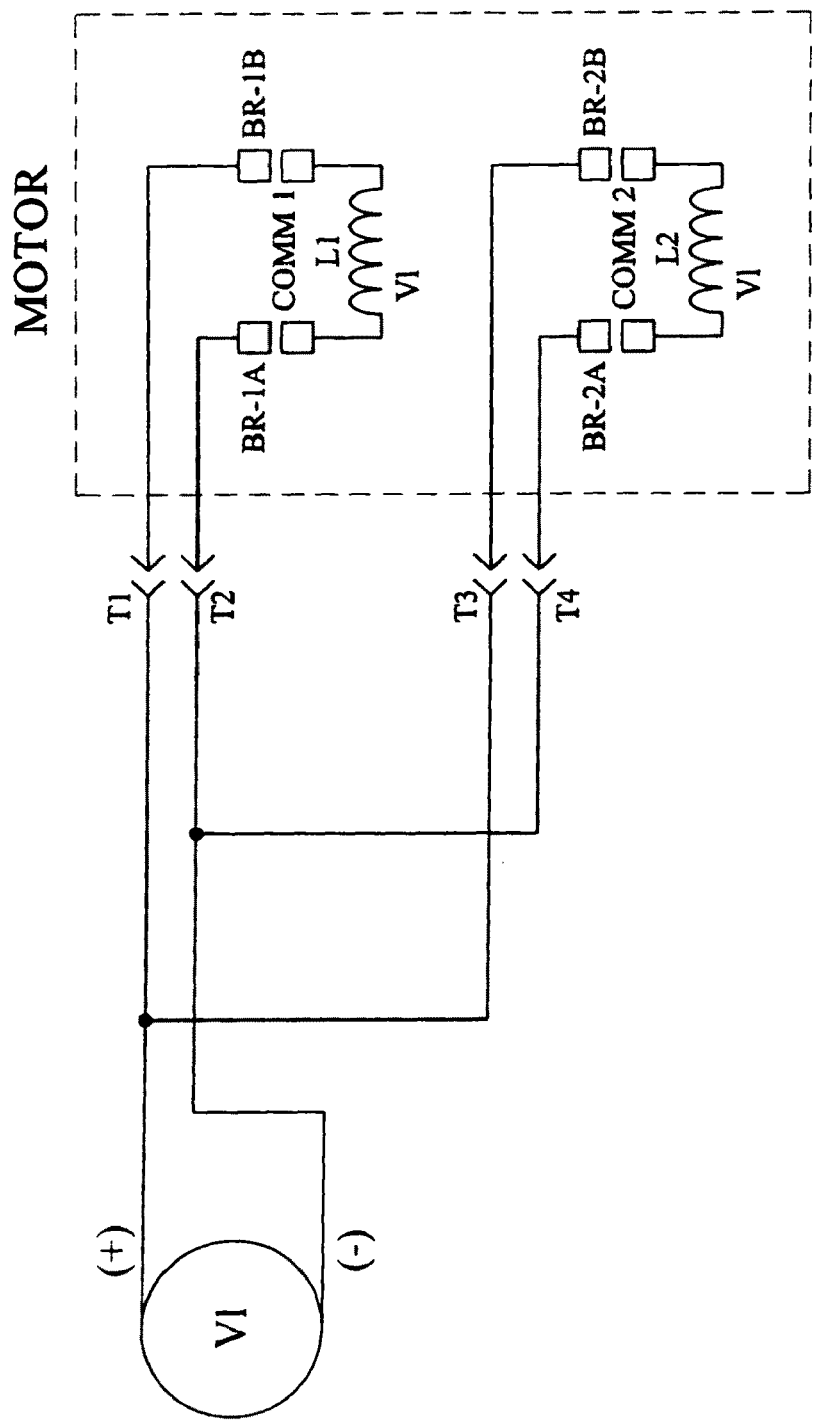
FIG. 13 is a simplified circuit diagram of the motor with dual coil commutation from FIG. 12 in parallel configuration.
Figure 14:
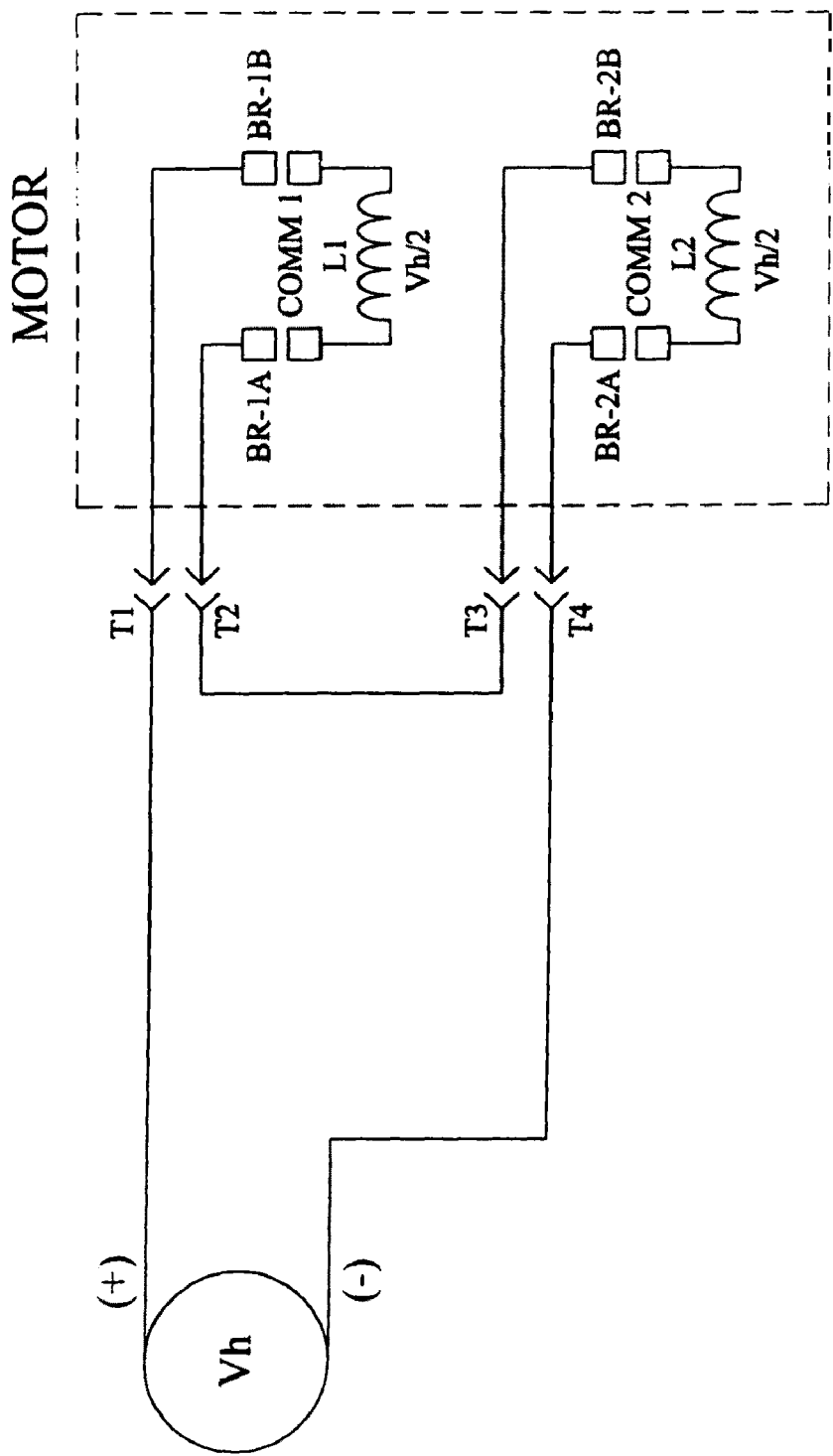
FIG. 14 is a simplified circuit diagram of the motor with dual coil commutation from FIG. 12 in series configuration.

Referring now to FIGS. 12-14, a circuit diagram of a power control circuit providing a motor with dual coil commutation in accordance with an exemplary embodiment of the present invention is shown. The power control circuit of FIG. 12 provides a user-selectable switch, wherein the desired power supply (e.g., either AC electric power or DC electric power) is selectable and dictates whether the dual coil configuration is in parallel or in series. For example, if a user desires the enhanced mobility that DC power via a battery pack may allow, the user selects DC power mode via an AC/DC switch, wherein the dual coil configuration becomes in parallel, whereas if a user desires AC power, the user selects AC power mode via an AC/DC switch, wherein the dual coil configuration becomes in series. FIG. 13 shows a simplified circuit diagram of the motor with dual coil commutation. FIG. 14 shows a simplified circuit diagram of the motor with dual coil commutation in series configuration.

Many configurations are available for the hybrid OPE discussed herein. While the hybrid OPE has been described for many embodiments, the invention presented is not limited to the specific structures provided. The invention and claims are intended to cover various modifications and equivalent arrangements included within the spirit and scope of the appended claims and teachings hereof. The scope of the claims is to be accorded the broadest interpretation so as to encompass all such modifications and equivalent structures and functions.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hand-held power tool for operatively accepting alternating current and direct current, comprising:
    a working element;
    a motor coupled with the working element for driving the working element, the motor comprising a connection for selectably coupling the motor with one or more of a source of alternating current and a source of direct current;
    wherein the motor is capable of selectably receiving power from either of the alternating current source and the direct current source, as well as from both the alternating current source and the direct current source, for driving the working element;
    wherein the output voltage of said source of alternating current is greater than the output voltage of said source of direct current.

2. The hand-held power tool of claim 1, further comprising a user selectable boost switch for selectably increasing power output to the motor;
    wherein the boost switch operatively connects to a power control module for converting alternating current from the alternating current source to direct current.

3. The hand-held power tool of claim 2, wherein the power control module controls the speed of the motor by selecting a first power output or a second power output through the boost switch.

4. The hand-held power tool of claim 1, further comprising a user selectable boost switch for selectably increasing power output to the motor;
    wherein the boost switch operatively connects a secondary direct current source to the motor.

5. The hand-held power tool of claim 1, wherein the motor further comprises a commutator configuration; wherein the commutator configuration is a parallel configuration when the motor receives power substantially from the direct current source.

6. The hand-held power tool of claim 5, wherein the commutator configuration is a series configuration when the motor receives power substantially from the alternating current source.

7. A hand-held power tool with boost and conserve feature for operatively accepting alternating current and direct current, comprising:
    a working element;
    a motor coupled with the working element for driving the working element, the motor comprising a connection for selectably coupling the motor with one or more of a source of alternating current and a source of direct current;
    a user selectable boost switch for selectably increasing power output to the motor;
    wherein the motor is capable of selectably receiving power from either of the alternating current source and the direct current source, as well as from both the alternating current source and the direct current source, for driving the working element;
    wherein the output voltage of said source of alternating current is greater than the output voltage of said source of direct current.

8. The hand-held power tool of claim 7, wherein the boost switch operatively connects to a power control module for converting alternating current from the alternating current source to direct current.

9. The hand-held power tool of claim 8, wherein the power control module controls the speed of the motor by selecting a first power output or a second power output through the boost switch.

10. The hand-held power tool of claim 7, wherein the boost switch operatively connects a secondary direct current source to the motor.

11. The hand-held power tool of claim 7, wherein the motor further comprises a commutator configuration.

12. The hand-held power tool of claim 11, wherein the commutator configuration is a parallel configuration when the motor receives power substantially from the direct current source.

13. The hand-held power tool of claim 12, wherein the commutator configuration is a series configuration when the motor receives power substantially from the alternating current source.

* * * * *